(12) United States Patent
Hano et al.

(10) Patent No.: US 9,685,894 B2
(45) Date of Patent: Jun. 20, 2017

(54) BRUSHLESS MOTOR CONTROLLER AND CONTROL METHOD

(71) Applicant: HITACHI AUTOMOTIVE SYSTEMS, LTD., Hitachinaka-shi, Ibaraki (JP)

(72) Inventors: Masaki Hano, Isesaki (JP); Takeshi Umetsu, Isesaki (JP)

(73) Assignee: HITACHI AUTOMOTIVE SYSTEMS, LTD., Hitachinaka-shi (JP)

( * ) Notice: Subject to any disclaimer, the term of this patent is extended or adjusted under 35 U.S.C. 154(b) by 0 days.

(21) Appl. No.: 15/126,467

(22) PCT Filed: Sep. 12, 2014

(86) PCT No.: PCT/JP2014/074221
§ 371 (c)(1),
(2) Date: Sep. 15, 2016

(87) PCT Pub. No.: WO2015/141029
PCT Pub. Date: Sep. 24, 2015

(65) Prior Publication Data
US 2017/0093312 A1    Mar. 30, 2017

(30) Foreign Application Priority Data

Mar. 20, 2014    (JP) ................. 2014-058748

(51) Int. Cl.
*H02K 29/06*    (2006.01)
*H02P 6/15*    (2016.01)
(Continued)

(52) U.S. Cl.
CPC .............. *H02P 6/15* (2016.02); *H02P 6/085* (2013.01); *H02P 6/12* (2013.01); *H02P 6/18* (2013.01); *H02P 27/08* (2013.01)

(58) Field of Classification Search
CPC ... B25B 21/02; B25B 23/1405; B25B 21/026; B23B 23/1475; H02P 27/00
See application file for complete search history.

(56) References Cited

U.S. PATENT DOCUMENTS

2009/0200971 A1    8/2009    Iwaji et al.
2009/0267549 A1    10/2009    Kitagawa
(Continued)

FOREIGN PATENT DOCUMENTS

JP    2003-319686 A    11/2003
JP    2009-100567 A    5/2009
(Continued)

*Primary Examiner* — Shawki S Ismail
*Assistant Examiner* — Zoheb Imtiaz
(74) *Attorney, Agent, or Firm* — Foley & Lardner LLP

(57) ABSTRACT

When a set duty Dt of a PWM signal is less than a minimum duty (Dmin) that allows for pulse induced voltage detection, the PWM signal in which a duty $D_1$ during a predetermined period is limited to Dmin and in which a duty $D_2$ during the other period is adjusted so as to satisfy $Dt=(D_1+D_2)/2$ is applied to the switching elements connected to one of the two phases. When the duty $D_2$ during the other period takes a negative value, the pulse-voltage application target during the other period is changed to the switching elements connected to the other of the two phases, and the duty $D_1$ during the predetermined period is corrected and increased so as to compensate for an actual drop in the duty $D_2$ during the other period corresponding to a dead-time period in a complementary PWM method.

10 Claims, 28 Drawing Sheets

(51) Int. Cl.
*H02P 6/08* (2016.01)
*H02P 6/18* (2016.01)
*H02P 27/08* (2006.01)
*H02P 6/12* (2006.01)

(56) References Cited

U.S. PATENT DOCUMENTS

| | | | |
|---|---|---|---|
| 2012/0234566 A1* | 9/2012 | Mashiko | B25B 21/02 173/93.5 |
| 2013/0264987 A1* | 10/2013 | Uchida | H02K 7/145 318/495 |
| 2014/0229066 A1* | 8/2014 | Harada | B62D 5/0481 701/41 |
| 2015/0336249 A1* | 11/2015 | Iwata | B25B 21/02 173/1 |

FOREIGN PATENT DOCUMENTS

| | | |
|---|---|---|
| JP | 2009-189176 A | 8/2009 |
| JP | 2009-268225 A | 11/2009 |
| JP | 2013-066343 A | 4/2013 |

* cited by examiner

BRUSHLESS MOTOR CONTROLLER AND CONTROL METHOD

TECHNICAL FIELD

The present invention relates to a brushless motor controller and a control method, specifically to a controller and a control method for sensorless determination on energization mode switching in a three-phase brushless motor.

BACKGROUND ART

According to a conventional brushless motor controller and a control method, it is known to switch between energization modes for applying a pulse voltage to two phases in a three-phase brushless motor in accordance with a pulse width modulation (PWM) signal when the pulse induced voltage induced in a non-energized phase during the pulse voltage application crosses a threshold defined for each of the energization modes (see Patent Document 1, for example).

However, the pulse induced voltage oscillates immediately after the pulse voltage is started to be applied to two phases. Thus, if the duty of the PWM signal is reduced so as to rotate the brushless motor at a low speed, the pulse induced voltage might be sampled within the oscillation period of the pulse induced voltage, and thus the energization modes might be switched at wrong timing.

To address this, in the brushless motor controller and control method according to Patent Document 1, the pulse induced voltage in a non-energized phase is detected in a predetermined period (hereinafter referred to as "main period") among multiple contiguous periods in the PWM signal while a duty (hereinafter referred to as "main period duty") during the main period of the PWM signal is limited to a minimum duty so as to avoid the sampling of the pulse induced voltage within the oscillation period. In addition, a duty (hereinafter referred to as "adjustment period duty") during each of periods (hereinafter referred to as "adjustment periods") other than the main period among multiple contiguous periods in the PWM signal is set to a value smaller than the main period duty. Thereby, an average duty, which is an average value of the main period duty and the adjustment period duties, is adjusted to be equal to a duty (hereinafter referred to as "set duty") set for control such as rotation speed feedback control.

REFERENCE DOCUMENT LIST

Patent Document

Patent Document 1: JP 2013-66343 A

SUMMARY OF THE INVENTION

Problem to be Solved by the Invention

Here, when the set duty is set to a value that is less than the minimum duty and close to zero, it is conceivable to reduce each adjustment period duty to a negative value, in other words, to make an electric current flow in the direction opposite to that in the main period, so as to generate a torque during the direction opposite to that during the main period, since the main period duty is limited to the minimum duty.

Incidentally, in a complementary PWM method, a PWM signal is applied to either of two switching elements, i.e. an upper-arm switching element and a lower-arm switching element, which are connected to each phase, depending on whether the phase is an upstream phase or a downstream phase of the electric current, while a complementary PWM signal (an example of the pulse width modulation signal in the claims), which has a phase opposite to that of the PWM signal, is applied to the other one of these two switching elements. When such a complementary PWM method is employed, a dead time during which these two switching elements are both turned OFF is sometimes provided so as to avoid arm short circuit which is caused when the ON period of the high-side switching element overlaps with the ON period of the low-side switching element.

However, when such a dead time is provided, and the adjustment period duty is set to a negative value so as to let an electric current flow in the direction opposite to that in the main period, a phase terminal voltage might change to a value contrary to the original intention. This increases the energization time in the adjustment period by an amount corresponding to the dead time.

Accordingly, in a period where the adjustment period duty takes a negative value, an actual value of the adjustment period duty is reduced according to the dead time, and thus an actual value of the average duty is also reduced. Thus, when the value of the adjustment period duty changes from positive to negative, a gap, during which the rotation speed of the brushless motor drops quickly, occurs. When rotation speed feedback control is performed with the presence of such a gap, the hunting of the rotation speed of the brushless motor might occur depending on the value of the set duty.

The present invention has been made in view of the above problem, and has an object to provide a brushless motor controller and a control method that improve the linearity in the rotation speed of the brushless motor with respect to the set duty.

Means for Solving the Problem

To this end, in the brushless motor controller and control method according to the present invention, which is based on the premise that energization modes for causing switching elements bridge-connected to a three-phase brushless motor to apply, to two phases, a pulse voltage according to a pulse width modulation signal are switched therebetween based on a detected value of a pulse induced voltage induced in a non-energized phase, the pulse width modulation signal is applied as follows. When a set duty of the pulse width modulation signal is less than a first predetermined value, there is limited, to the first predetermined value, a duty during a predetermined period among multiple contiguous periods of the pulse width modulation signal to be applied to the switching elements connected to one of the two phases so as to set the predetermined period as a period for detecting the pulse induced voltage. In addition, a duty during a period other than the predetermined period among the multiple contiguous periods in the pulse width modulation signal is adjusted on the basis of the set duty and the duty during the predetermined period which is limited to the first predetermined value. Here, the duty during the period other than the predetermined period is applied to the switching elements connected to the one of the two phases when the set duty is not less than a second predetermined value that is less than the first predetermined value, but applied to the switching elements connected to the other of the two phases when the set duty is less than the second predetermined value. Moreover, the duty during the predetermined period is corrected and increased when the set duty is less than the second predetermined value.

Effects of the Invention

The brushless motor controller and control method according to the present invention make it possible to improve the linearity in the rotation speed of the brushless motor with respect to the set duty, and thus can make hunting less likely to be generated in the rotation speed of the brushless motor during rotation speed feedback control.

MODE FOR CARRYING OUT THE INVENTION

Hereinafter, an embodiment according to the present invention will be described in detail with reference to the attached drawings.

Figure 1:
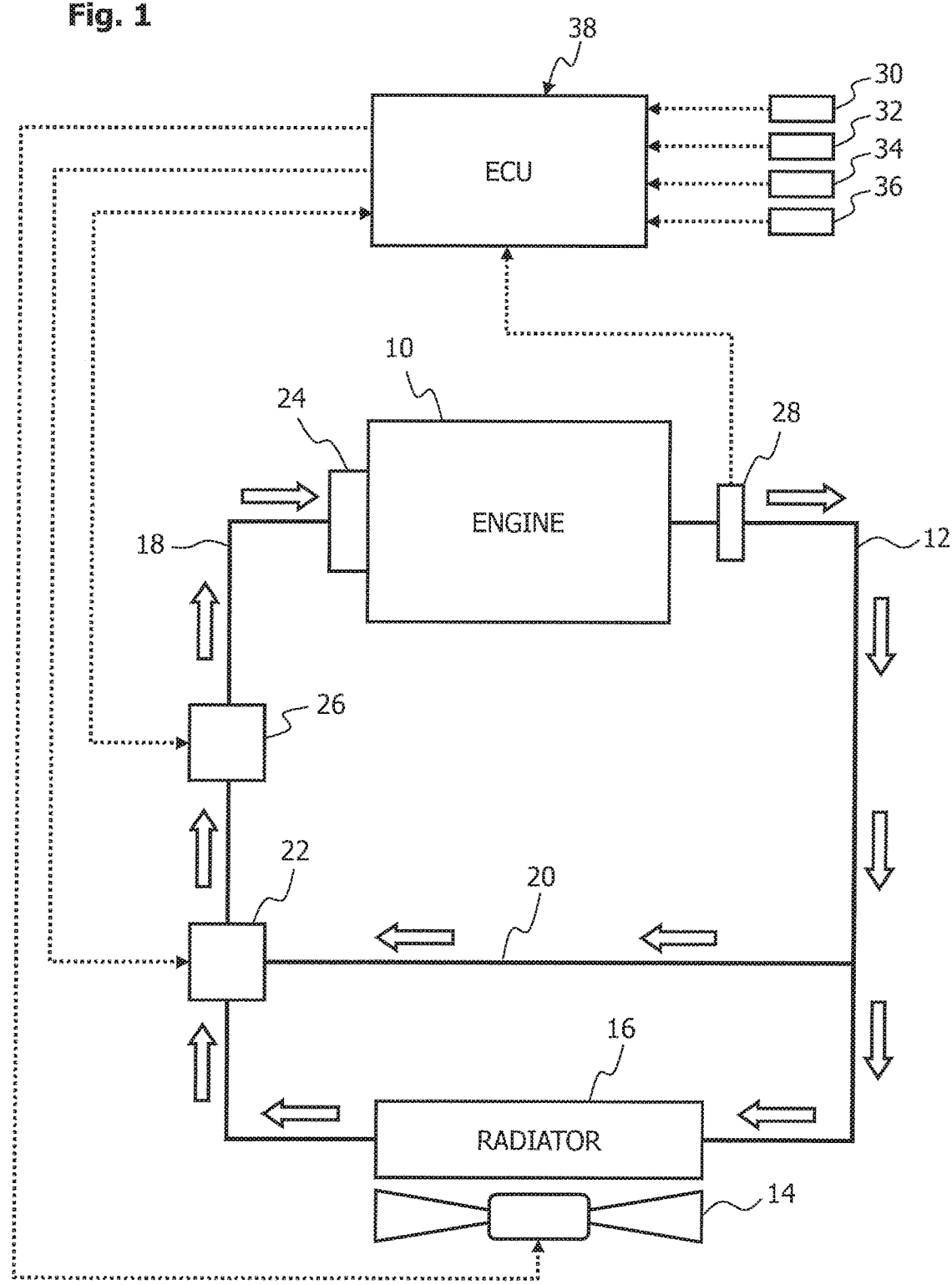
FIG. 1 illustrates a configuration of an example of a cooling system for cooling an engine.

FIG. 1 illustrates an example of a cooling system for cooling an engine by circulating a refrigerant therethrough.

Cooling water, which is used as a refrigerant which cools components, such as a cylinder block and a cylinder head, in an engine 10 mounted in a vehicle, is introduced through a first cooling water passage 12 to a radiator 16 disposed next to an electric radiator fan 14. The cooling water introduced to radiator 16 exchanges heat with outside air while passing through a radiator core provided with fins, and thus decreases in temperature. The cooling water reduced in temperature by passing through radiator 16 flows through a second cooling water passage 18, and back to engine 10. As the refrigerant for cooling engine 10, a long life coolant (LLC) may be used in place of the cooling water.

To allow the cooling water discharged from engine 10 to bypass radiator 16, first cooling water passage 12 is communicatively connected to second cooling water passage 18 through a bypass passage 20. At the connection between second cooling water passage 18 and the downstream end of bypass passage 20, an electrically-controlled thermostat 22 is disposed. Electrically-controlled thermostat 22 opens or closes bypass passage 20 so as to incrementally or continuously change its cross sectional area between full open and full close. For example, electrically-controlled thermostat 22 may be an on-off valve including a heater and wax. The on-off valve is opened or closed by thermal expansion of the wax caused by the heater driven through a drive circuit in accordance with duty (duty cycle) of a PWM signal. Thus, the flow rate of the cooling water through radiator 16 can be changed by controlling electrically-controlled thermostat 22 using the duty.

Between the downstream end of second cooling water passage 18, and electrically-controlled thermostat 22, a mechanical water pump 24 and an electric water pump 26 for forcing the cooling water to circulate by way of engine 10 and radiator 16 are disposed. Mechanical water pump 24 is mounted on engine 10 so as to close its cooling water inlet, and driven by, for example, a cam shaft of engine 10. Electric water pump 26 is driven by a brushless motor, which is a drive source other than engine 10 and will be described later, so as to provide cooling performance or maintain air heating functioning even while engine 10 is stopped by an idle reduction function. The power system of the vehicle is configured to be capable of drive electric water pump 26 even during idle reduction.

The cooling system is provided with a control system for controlling the drive of radiator fan 14, electrically-controlled thermostat 22 and electric water pump 26. The control system includes a water temperature sensor 28 which serves as cooling water temperature detecting means for detecting the temperature (cooling water temperature) of the cooling water discharged from engine 10, a vehicle speed sensor 30 for detecting a vehicle speed, a temperature sensor 32 for detecting an outside air temperature, a rotation speed sensor 34 for detecting an engine rotation speed, and a load sensor 36 for detecting an engine load. The output signals from water temperature sensor 28, vehicle speed sensor 30, temperature sensor 32, rotation speed sensor 34 and load sensor 36 are inputted to an engine control unit (hereinafter referred to as "ECU") 38 including a computer therein. In response, ECU 38 controls radiator fan 14, electrically-controlled thermostat 22 and electric water pump 26 according to a control program stored in a read only memory (ROM) or the like therein.

ECU 38 iteratively determines whether or not conditions for driving electric water pump 26 are satisfied at least during the operation of engine 10. When determining that these conditions for driving are satisfied, ECU 38 outputs a drive command signal to electric water pump 26. When determining that these conditions for driving are not satisfied, ECU 38 outputs, to electric water pump 26, a stop command signal to stop or prohibit the drive of electric water pump 26.

For the cooling system for engine 10 configured as above, there is a demand that, at the start-up of or during the warm-up of engine 10, electric water pump 26 should circulate the cooling water at a relatively low flow rate so as to suppress an occurrence of a hot spot in which the cooling water temperature rises only in and around engine 10, and thus to achieve a reduction in thermal distortion and an improvement in water temperature detection accuracy. To meet this demand, the brushless motor for driving electric water pump 26 is required to expand its controllable rotation speed range to the low rotation speed side.

In this embodiment, a brushless motor 100 drives electric water pump 26 included in the cooling system for cooling engine 10. Note, however, that the device driven by brushless motor 100 is not limited to electric water pump 26. Alternatively, brushless motor 100 may drive an electric oil pump included in a hydraulic pump system for automatic transmission, for example.

Figure 2:
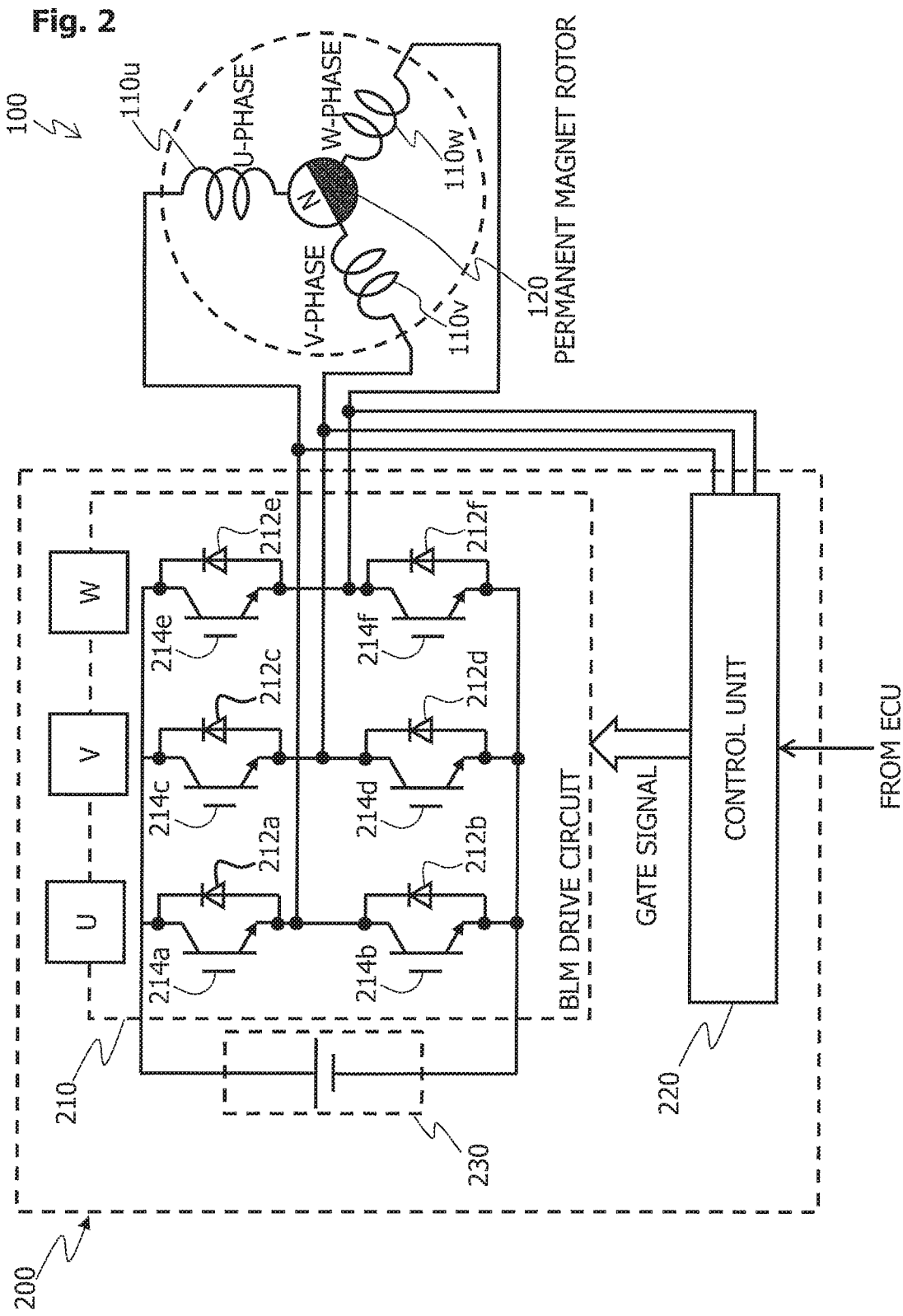
FIG. 2 illustrates a circuit configuration of an example of a brushless motor and a controller therefor.

FIG. 2 illustrates an example of brushless motor 100 for driving electric water pump 26 and a controller therefor.

Brushless motor 100 is a three-phase direct current (DC) brushless motor (three-phase synchronous electric motor), and includes star-connected three-phase coils, which are a U-phase coil 110u, a V-phase coil 110v and a W-phase coil 110w, provided in an unillustrated cylindrical stator, and a rotor (permanent magnet rotor) 120 rotatably disposed in a space defined in a center portion of the stator.

A controller 200 (hereinafter referred to as "motor controller") for brushless motor 100 includes a drive circuit 210 and a control unit 220. Control unit 220 includes a microcomputer, and communicates with ECU 38. The configuration of motor controller 200 is not limited to that disposed near brushless motor 100. Alternatively, at least control unit 220 of motor controller 200 may be formed integrally with ECU 38 or another control unit, for example.

Drive circuit 210 has a circuit formed of three-phase bridge-connected switching elements 214a to 214f and a power supply circuit 230. Switching elements 214a to 214f are respectively include antiparallel diodes 212a to 212f, and power supply circuit 230 generates a power supply voltage $V_B$. Switching elements 214a, 214c and 214e are high-side switching elements, which constitute an upper arm, connected respectively to the U-phase, the V-phase and the W-phase. Switching elements 214b, 214d and 214f are low-side switching elements, which constitute a lower arm, connected respectively to the U-phase, the V-phase and the W-phase. Each of switching elements 214a to 214f is formed of a semiconductor element, such as a FET or an insulated gate bipolar transistor (IGBT), for use in power control. Control terminals (gate terminals) of switching elements 214a to 214f are connected to control unit 220. Control unit 220 controls a voltage applied on brushless motor 100 by controlling the ON and OFF of switching elements 214a to 214f by pulse width modulation (PWM).

In PWM control, timing for turning ON or OFF each of switching elements 214a to 214f is detected by generating a PWM signal through comparison between a value (voltage level) of a carrier signal having a triangle wave and a value (voltage level) of an instruction signal set based on an applied voltage command value.

Control unit 220 performs sensorless drive control on brushless motor 100 without using any sensor for detecting position information on rotor 120. Specifically, control unit 220 performs such sensorless drive by a sine-wave drive method and a square-wave drive method.

In the sine-wave drive method, control unit 220 drives brushless motor 100 by applying a sine wave voltage to each phase. In this sine-wave drive method, while control unit 220 acquires the position information on rotor 120 based on an induced voltage (speed electromotive voltage) generated by rotation of rotor 120, control unit 220 estimates a position of rotor 120 based on a motor rotation speed during a detecting period of the rotor position based on the speed electromotive voltage, to calculate a three-phase output value based on the estimated position of rotor 120 and the PWM duty, so that the direction and magnitude of an electric current is controlled based on differences between phase-to-phase voltages, to thereby allow a three-phase alternating current to flow through the phases.

In the square-wave drive method, control unit 220 drives brushless motor 100 by sequentially switching between patterns (energization modes) for selecting, from the three phases, two phases to which a pulse voltage is to be applied, each time rotor 120 reaches one of predetermined positions.

In this square-wave drive method, control unit 220 detects an angular position of rotor 120, corresponding to energization mode switching timing, by acquiring position information on rotor 120 based on voltages (a transformer-induced voltage and a pulse induced voltage) induced in a non-energized phase by applying a pulse-form voltage to energized phases.

Here, the speed electromotive voltage detected for position detection in the sine-wave drive method decreases in output level as the motor rotation speed decreases, which leads to degradation in position detection accuracy in a low rotation speed range. On the other hand, the pulse induced voltage detected for position detection in the square-wave drive method is generated in a non-energized phase when saturation of the magnetic circuit changes according to the position of rotor 120, thus changes in accordance with the rotational position of rotor 120, and thus can be detected in a low rotation speed range including under motor stop condition. Accordingly, the square-wave drive method makes it possible to maintain position detection accuracy even in a low rotation speed range.

Thus, for example, in controlling brushless motor 100, control unit 220 may employ the sine-wave drive method for sensorless control (high-speed sensorless control) in a high rotation speed range in which rotor position information can be sufficiently accurately detected by this sine-wave drive method.

On the other hand, for example, in controlling brushless motor 100, control unit 220 may employ the square-wave drive method for sensorless control (low-speed sensorless control) in a low rotation speed range in which rotor position information cannot be sufficiently accurately detected by the sine-wave drive method. This rotation speed range in which position information cannot be sufficiently accurately detected by the sine-wave drive method includes a rotation speed range in which no speed electromotive voltage, which is used in the high-speed sensorless control, is generated, a rotation speed range in which only a speed electromotive voltage affected by noises and/or the like is generated, and a rotation speed range at motor startup.

Moreover, in the PWM control for brushless motor 100, control unit 220 determines a PWM control duty according to a difference between the motor rotation speed and the target rotation speed so as to bring the motor rotation speed closer to the target rotation speed.

Figure 3:
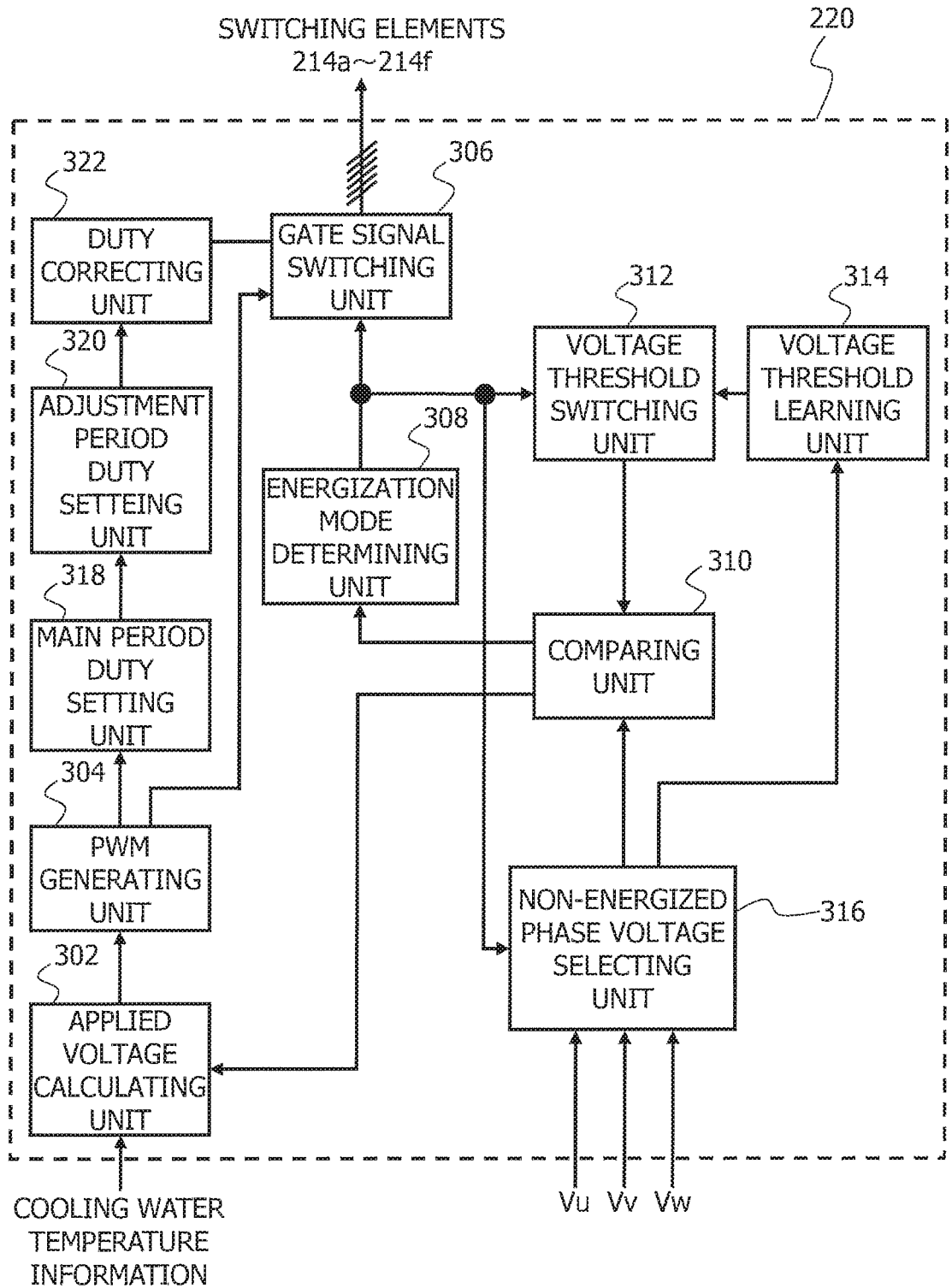
FIG. 3 is a block diagram illustrating a configuration of part of a control unit.

FIG. 3 is a functional block diagram exemplifying components related to low-speed sensorless control in control unit 220.

Control unit 220 includes an applied voltage calculating unit 302, a PWM generating unit 304, a gate signal switching unit 306, an energization mode determining unit 308, a comparing unit 310, a voltage threshold switching unit 312, a voltage threshold learning unit 314, a non-energized phase voltage selecting unit 316, a main period duty setting unit 318, an adjustment period duty setting unit 320, and a duty correcting unit 322.

Applied voltage calculating unit 302 calculates the target rotation speed and the motor rotation speed of brushless motor 100, and calculates the applied voltage command value based on the target rotation speed and the motor rotation speed.

PWM generating unit 304 generates a PWM signal, which is pulse width modulated, based on the applied voltage command value calculated by applied voltage calculating unit 302.

Energization mode determining unit 308 outputs a mode command signal for determining the energization mode of drive circuit 210. Triggered by a mode switching trigger signal outputted by comparing unit 310, energization mode determining unit 308 switches between six energization modes.

The energization modes are patterns for selecting two phases to which a pulse voltage is applied from the three phases of U, V and W in brushless motor 100, and include first to sixth energization modes M1 to M6. In the first energization mode M1, a current is caused to flow from the U-phase to the V-phase. In the second energization mode M2, a current is caused to flow from the U-phase to the W-phase. In the third energization mode M3, a current is caused to flow from the V-phase to the W-phase. In the fourth energization mode M4, a current is caused to flow from the V-phase to the U-phase. In the fifth energization mode M5, a current is caused to flow from the W-phase to the U-phase. In the sixth energization mode M6, a current is caused to flow from the W-phase to the V-phase.

Energization mode determining unit 308 outputs a mode command signal that instructs any one of the first to sixth energization modes M1 to M6 according to the mode switching trigger signal outputted by comparing unit 310.

Gate signal switching unit 306 determines the operational states to which switching elements 214a to 214f in drive circuit 210 are switched on the basis of the mode command signal outputted by energization mode determining unit 308 and the PWM signal generated by PWM generating unit 304. According to the determination, gate signal switching unit 306 outputs six gate pulse signals to motor drive circuit 210.

Voltage threshold switching unit 312 outputs voltage thresholds used for detecting whether energization mode switching timing has come, while sequentially switching between the voltage thresholds in accordance with the next energization modes. The switching timing for the threshold is determined on the basis of the mode command signal outputted by energization mode determining unit 308.

According to the mode command signal, non-energized phase voltage selecting unit 316 selects a detected value of a non-energized phase voltage from detected values of three-phase terminal voltages Vu, Vv and Vw of brushless motor 100, and outputs the non-energized phase voltage to comparing unit 310 and voltage threshold learning unit 314.

Strictly speaking, the non-energized phase terminal voltage is a voltage between the ground (GND) and the terminal. However, in the embodiment, a voltage at a neutral point is detected or estimated to be half the power supply voltage $V_B$, and a difference between the voltage at the neutral point and the voltage between the ground (GND) and the terminal is calculated and used as the non-energized phase terminal voltage.

By comparing the threshold outputted by voltage threshold switching unit 312 with the detected value of a non-energized phase voltage (detected value of a pulse induced voltage) outputted by non-energized phase voltage selecting unit 316, comparing unit 310 detects whether or not energization mode switching timing has come, in other words, whether or not the rotor reaches a position (magnetic pole position) at which the energization modes are switched from one to another. When detecting that the switching timing has come, comparing unit 310 outputs a mode switching trigger to energization mode determining unit 308.

Voltage threshold learning unit 314 updates a threshold for determining whether or not the energization mode switching timing has come, and to store therein the updated threshold.

The pulse induced voltage in the non-energized phase (open-circuit phase), varies due to manufacturing variations of brushless motor 100 or detection variations of the voltage detecting circuit. Thus, if the threshold is a fixed value, the energization mode switching timing might be erroneously determined to come.

To avoid this, voltage threshold learning unit 314 performs threshold learning processing by detecting a pulse induced voltage generated at a predetermined magnetic pole position corresponding to energization mode switching timing, and corrects the threshold stored in voltage threshold switching unit 312 on the basis of the detection result.

The number of the energization modes is six, which are the energization modes M1 to M6, as described above. In square-wave drive method, control unit 220 drives brushless motor 100 by sequentially switching between these energization modes M1 to M6 at the switching angular positions which are spaced at intervals of an electrical angle of 60 degrees, so as to sequentially switching, among the three phases, two phases to which a pulse voltage (pulse-form voltage) is to be applied.

Figure 4:
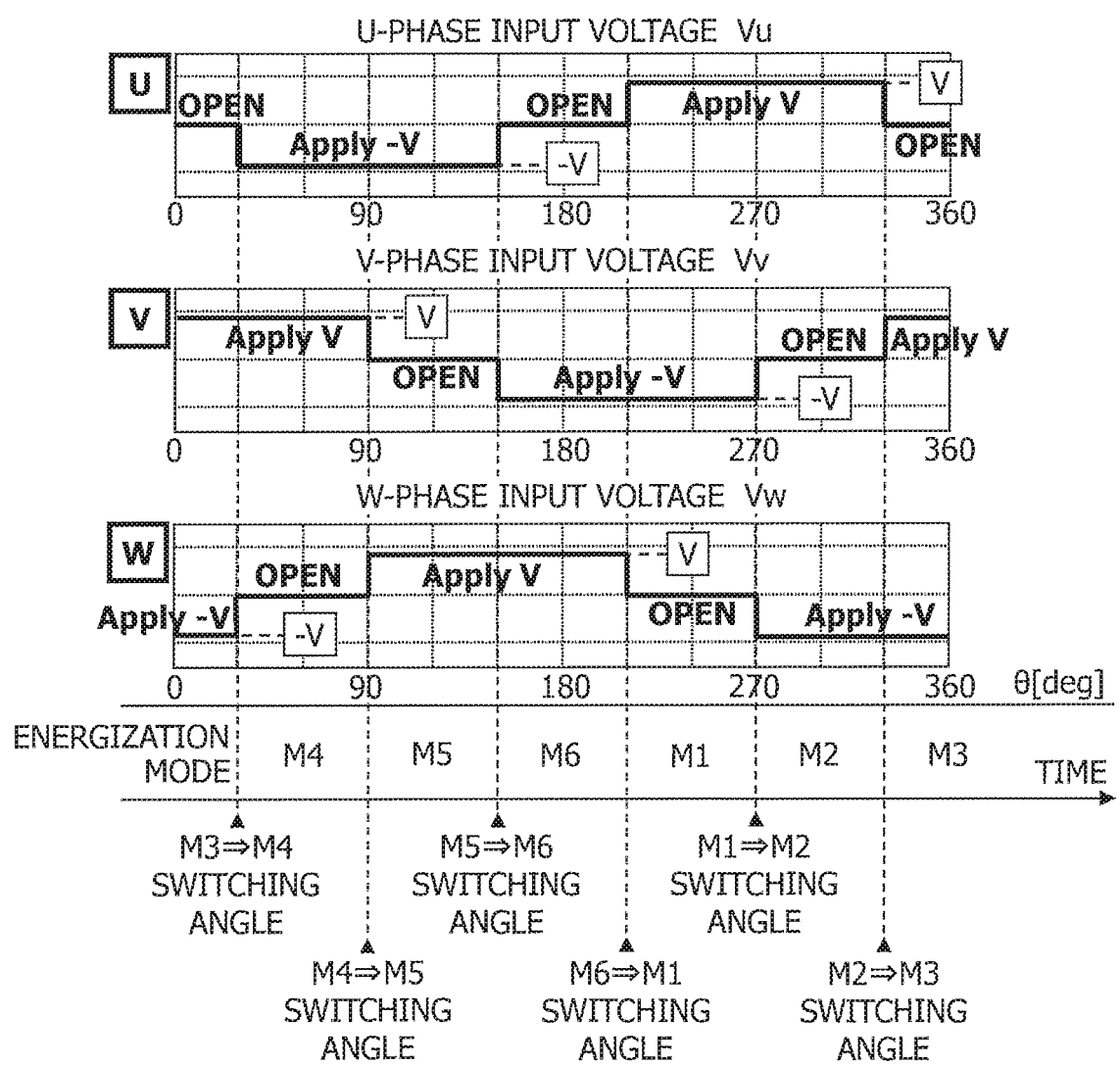
FIG. 4 is a time chart illustrating exemplary energization modes of the brushless motor.

As illustrated in FIG. 4, control unit 220 switches between the energization modes M1 to M6 as follows, where the reference angular position (angle=0 degree) of the rotor (magnetic pole) is the angular position of the U-phase coil. When the rotor angular position (magnetic pole position) is at 30 degrees, control unit 220 switches from the third energization mode M3 to the fourth energization mode M4.

When the rotor angular position is at 90 degrees, control unit 220 switches from the fourth energization mode M4 to fifth energization mode M5. When the rotor angular position is at 150 degrees, control unit 220 switches from the fifth energization mode M5 to the sixth energization mode M6. When the rotor angular position is at 210 degrees, control unit 220 switches from the sixth energization mode M6 to the first energization mode M1. When the rotor angular position is at 270 degrees, control unit 220 switches from the first energization mode M1 to the second energization mode M2. When the rotor angular position is at 330 degrees, control unit 220 switches from the second energization mode M2 to the third energization mode M3.

Voltage threshold switching unit 312 in control unit 220 stores therein, as updatable thresholds, the non-energized phase voltages (pulse induced voltages) at the rotor angular positions each corresponding to the energization mode switching timing. Voltage threshold switching unit 312 outputs one of the thresholds stored therein in accordance with the current energization mode.

When the non-energized phase voltage reaches the threshold, comparing unit 310 outputs a signal indicating detection of an angle corresponding to the next energization mode switching timing. Based on the signal, energization mode determining unit 308 switches from the current energization mode to the next.

Here, when having a duty less than a minimum duty (first predetermined value), the PWM signal generated by PWM generating unit 304 is outputted to gate signal switching unit 306 via main period duty setting unit 318, adjustment period duty setting unit 320 and duty correcting unit 322 for the following reasons.

Figure 5:
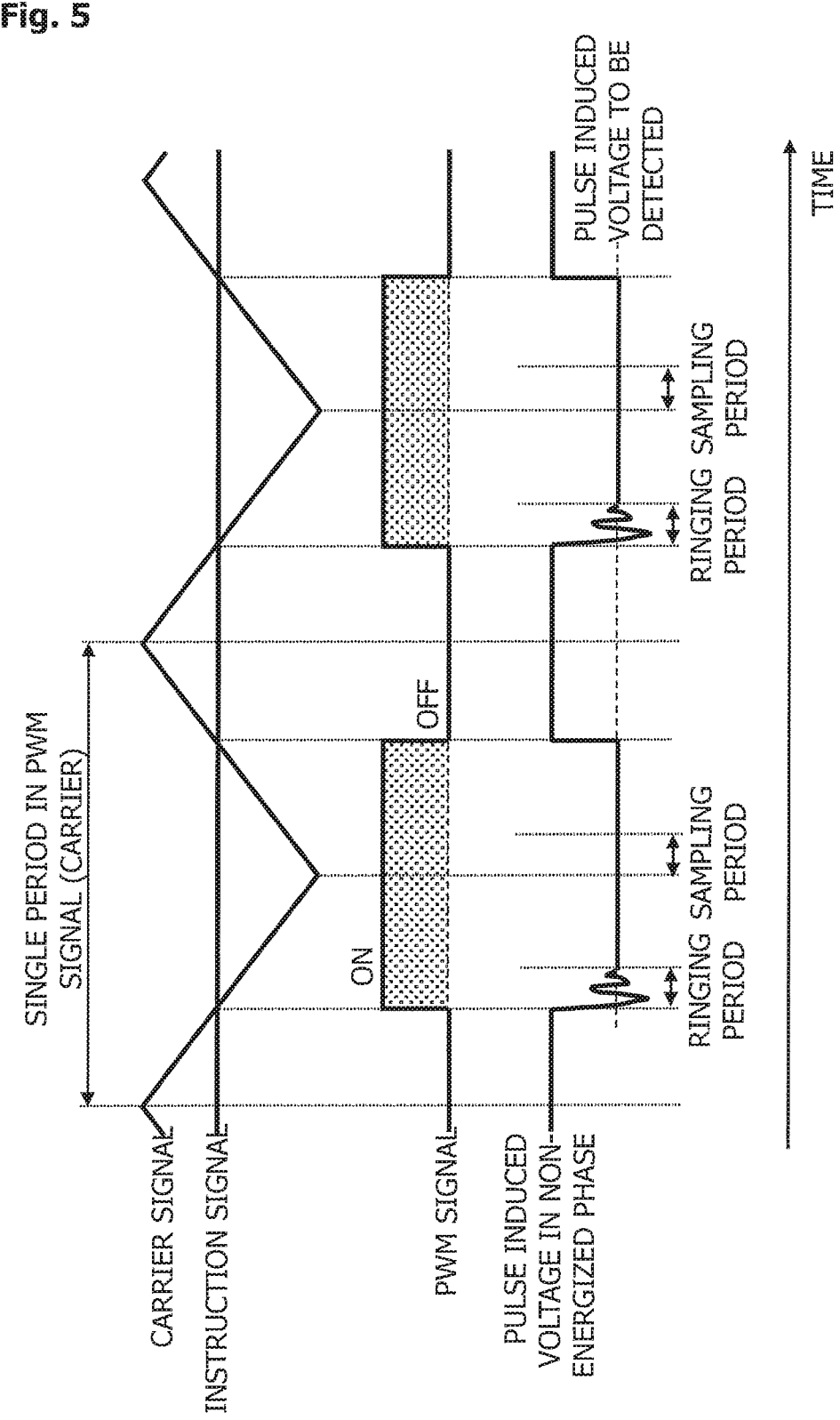
FIG. 5 is a timing chart illustrating detection timing of a pulse induced voltage.
Figure 6:
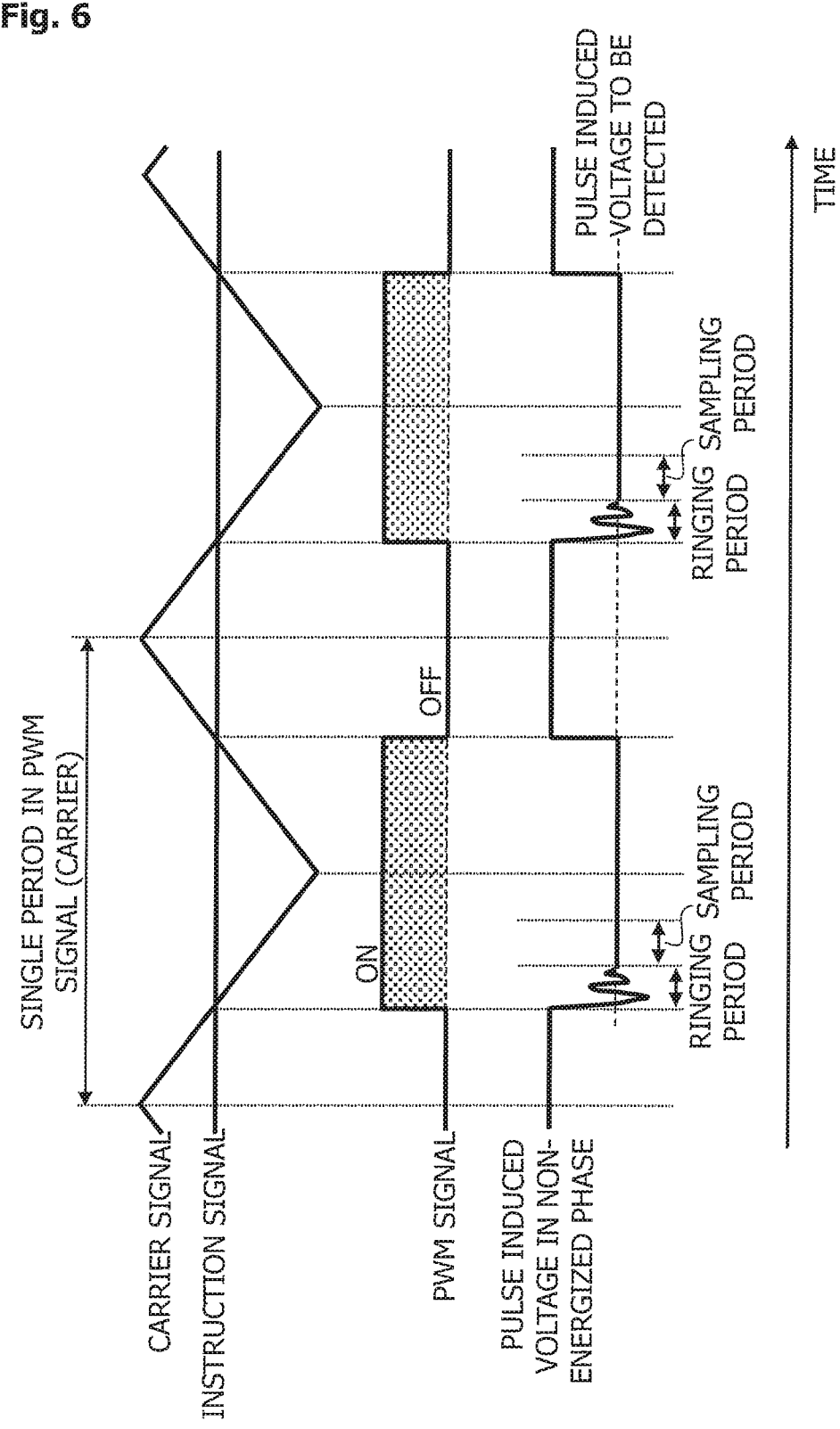
FIG. 6 is a timing chart illustrating another detection timing of a pulse induced voltage.

The pulse induced voltage in a non-energized phase is detected while the pulse voltage is applied between the other two phases under the condition in which the PWM signal is at the voltage level for turning ON switching elements 214a to 214f. However, as illustrated in FIGS. 5 and 6, oscillation of a pulse induced voltage, i.e. ringing, occurs immediately after the start of pulse voltage application. Thus, if, in order to rotate brushless motor 100 at a low speed, the duty of the PWM signal is reduced, and thus the ON period is reduced (application time of the pulse voltage is reduced), the pulse induced voltage might be sampled within the ringing period. This leads to erroneous detection of the pulse induced voltage, and thus erroneous determination of the energization mode switching timing.

Figure 7:
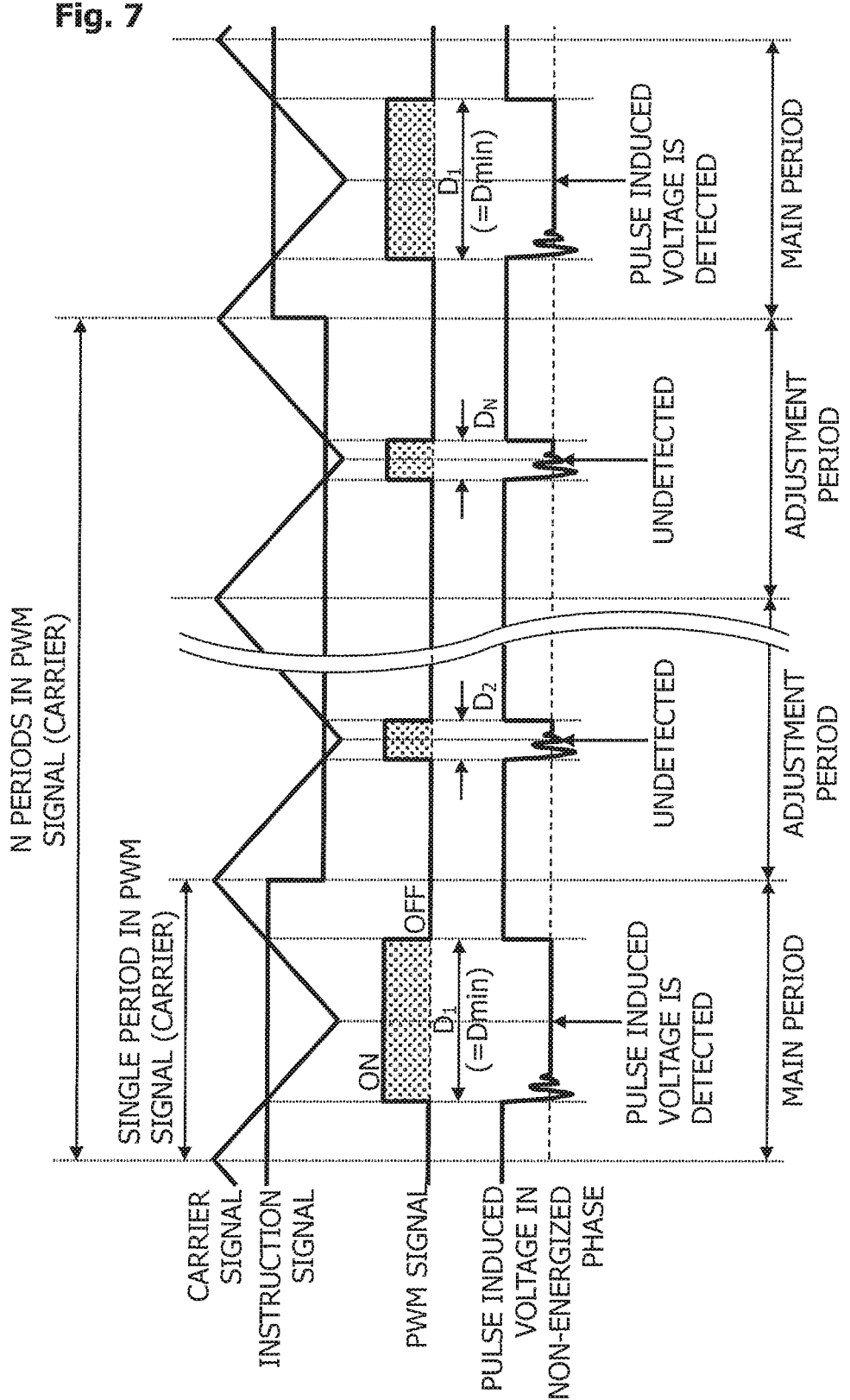
FIG. 7 is a time chart illustrating main periods and adjustment periods in the PWM signal.

Thus, to avoid the sampling of the pulse induced voltage within the ringing period, main period duty setting unit 318 serves as limiting means for limiting a main period duty $D_1$ to a minimum duty Dmin (first predetermined value) so as to detect a pulse induced voltage in a non-energized phase in a main period. Here, the main period is, as illustrated in FIG. 7, a predetermined period among multiple contiguous periods (for example, N periods, where N is an integer greater than one) of the PWM signal generated by PWM generating unit 304. The main period duty $D_1$ is a duty during the main period of the PWM signal. This limitation allows for improvement in detection accuracy of a pulse induced voltage, and reliable determination of the energization mode switching timing, thus preventing or reducing occurrence of loss of synchronism in brushless motor 100. Here, various patterns are conceivable for setting the main period, such as a pattern in which one or more predetermined periods among an N periods of the PWM signal are set as the main periods or a pattern in which first or last half periods among the N periods of the PWM signal are set as the main periods. Note, however, that, a predetermined period among the N periods of the PWM signal is set as the main period in this embodiment, for convenience of explanation.

Adjustment period duty setting unit 320 serves as adjusting means for adjusting an average duty Day equal to a set duty Dt by setting adjustment period duties $D_2$ to $D_N$ to values smaller than the main period duty $D_1$ (=Dmin) set by main period duty setting unit 318, as illustrated in FIG. 7. Here, the adjustment period duties $D_2$ to $D_N$ are duties during adjustment periods, which are other than the main period, among the contiguous N periods of the PWM signal generated by PWM generating unit 304. The average duty Day $\{=(D_1+D_2+\ldots+D_N)/N\}$ is an average value of the main period duty $D_1$ and the adjustment period duties $D_2$ to $D_N$. The set duty Dt is a set value based on the motor rotation speed and the target rotation speed. This adjustment allows for substantial application of the set duty Dt in the N periods of the PWM signal by reducing the duties during the adjustment periods instead of reducing the main period duty $D_1$ to below the minimum duty Dmin, which is inhibited. As a result, the operating range of electric oil pump 26 is expanded to the low rotation speed side.

Duty correcting unit 322 serves as correcting means for correcting and increasing the main period duty $D_1$ set by main period duty setting unit 318, as will be described later.

The N value, which specifies the number of the main and adjustment periods in each periodic repetition, can vary depending on various parameters such as the motor rotation speed, the target rotation speed, the set duty Dt of the PWM signal, and PWM carrier frequency. In the following description for this embodiment, N is set to 2 for convenience of explanation. Accordingly, control unit 220 achieves substantial application of the set duty Dt by using the main period duty $D_1$ and the adjustment period duty $D_2$ while limiting the main period duty $D_1$ to a value that ensures the detection accuracy of a pulse induced voltage.

Figure 8:
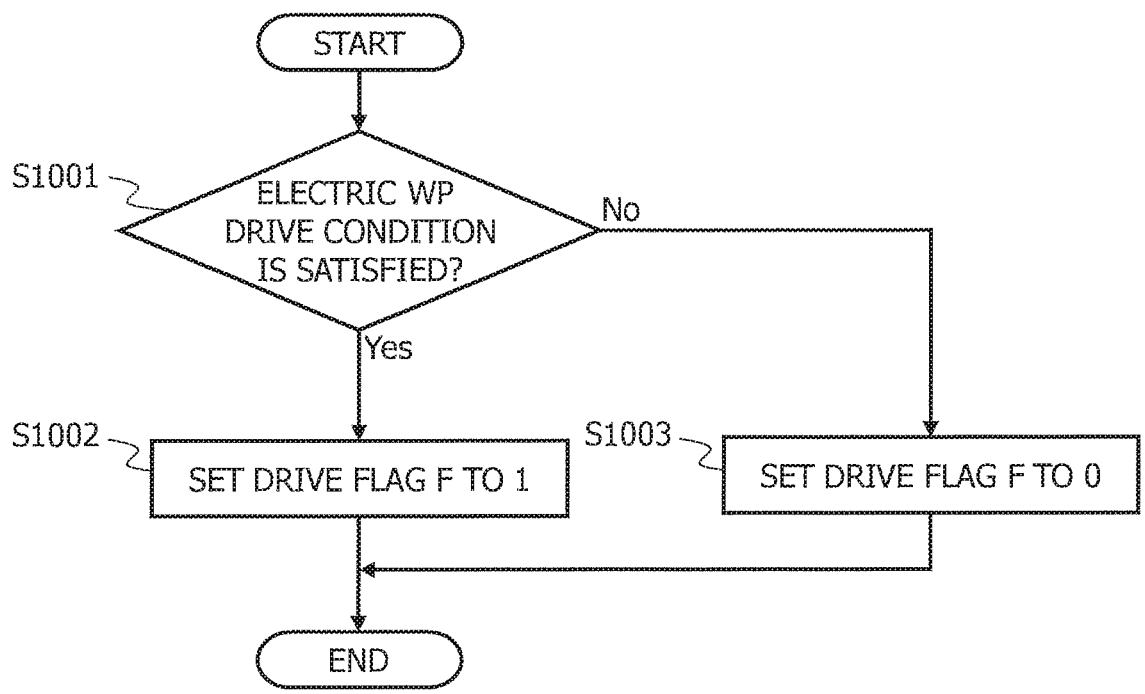
FIG. 8 is a flowchart for determining whether or not the conditions for driving the electric water pump are satisfied.

FIG. 8 represents the processing details relating to the conditions for driving brushless motor 100 (electric water pump 26). Triggered by the turning-ON of the ignition key, ECU 38 iteratively performs this processing.

In step 1001 (abbreviated as "S1001" in the flowchart, this also applies other steps to be described below), it is determined whether or not the conditions for driving electric water pump (electric WP) 26, i.e. for driving brushless motor 100, are satisfied.

For example, the conditions for driving brushless motor 100 may include: the power supply voltage $V_B$ of brushless motor 100 is above a predetermined voltage; no error is detected in either of brushless motor 100 and drive circuit 210 through various diagnosis steps; a power supply relay for brushless motor 100 is turned ON; a drive request for electric water pump 26 is generated; and the water or oil temperature in engine 10 is not less than a predetermined temperature.

In the cooling system illustrated in FIG. 1, motor controller 200 (control unit 220) may be configured to determine whether or not the conditions for driving electric water pump 26 are satisfied on the basis of various information received from ECU 38.

When the conditions for driving brushless motor 100 are determined to be satisfied (Yes), the operation proceeds to step 1002. In step 1002, a drive flag F is set to a value (1, for example) indicating that the driving conditions are satisfied, and stored in a writable storage such as random access memory (RAM). On the other hand, when the conditions for driving brushless motor 100 are determined not to be satisfied (No), the operation proceeds to step 1003. In step 1003, the drive flag F is set to a value (0, for example) indicating that the driving conditions are not satisfied, and stored in the RAM or the like.

Figure 9:
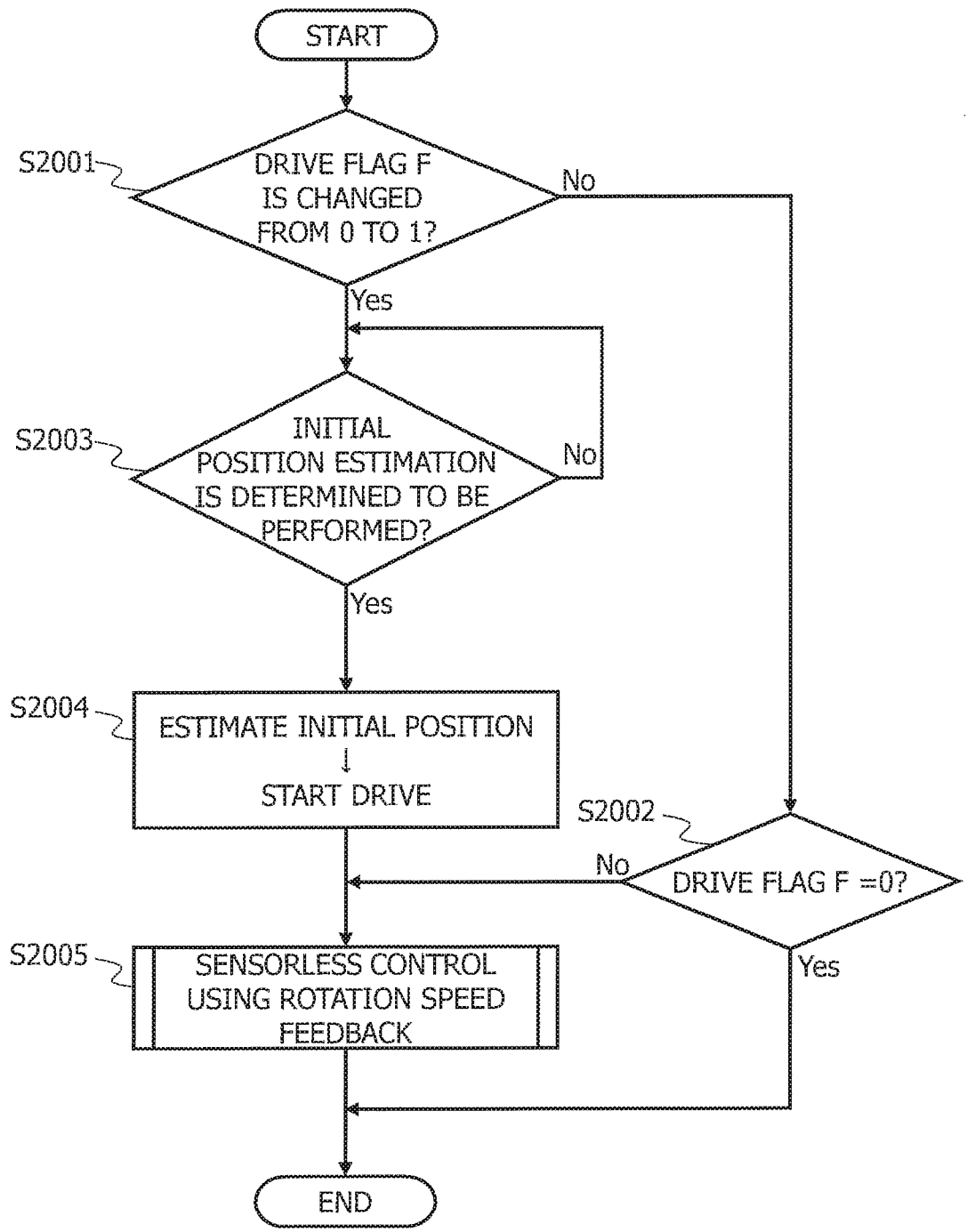
FIG. 9 is a flowchart representing an example of a main routine in motor control processing.

FIG. 9 represents a main routine of the control that control unit 220 iteratively performs on brushless motor 100 (electric water pump 26), upon triggered by the turning-ON of the ignition key.

In step 2001, control unit 220 determines whether or not the drive flag F has changed from 0 to 1, in other words, whether or not the conditions for driving brushless motor 100, which have not been satisfied, become satisfied. When control unit 220 determines that the drive flag F has changed from 0 to 1 (Yes), the operation proceeds to step 2003. When the drive flag F remains 0 or 1 or when the drive flag F has changed from 1 to 0 (No), the operation proceeds to step 2002.

In step 2002, control unit 220 determines whether or not the drive flag F is 0 so as to determine whether or not the sensorless control for brushless motor 100, which will be described later, is necessary. When the drive flag F is 0, which means the conditions for driving brushless motor 100 are not satisfied (Yes), this control processing ends so as to omit the sensorless control for brushless motor 100. On the other hand, when the drive flag F is 1, which means the conditions for driving brushless motor 100 are satisfied (No), the operation proceeds to step 2005 so as to perform the sensorless control.

When determining that the driving conditions, which have not been satisfied, become satisfied in step 2001, control unit 220 then determines whether or not a condition for performing processing for estimating an initial position (magnetic pole position at drive start) of brushless motor 100 is satisfied in step 2003.

For example, the condition for performing this estimation processing is that the motor rotation speed is not more than a predetermined speed, in other words, that the induced voltage (speed electromotive voltage), which is generated by rotation of rotor 120, is not more than a predetermined voltage. This estimation processing condition prevents brushless motor 100 from rotating at such a high speed as to affect the initial position estimation over a period from the start of the estimation processing to its completion even when a drive command is generated in the middle of inertial rotation of brushless motor 100.

Thus, the predetermined speed in the initial position estimation processing described above is set to the maximum motor rotation speed that allows an estimation error of the initial position to fall within an allowance. Accordingly, the predetermined voltage is set to an induced voltage (speed electromotive voltage) generated at this maximum rotation speed.

Here, the predetermined speed may satisfy Predetermined Speed≥0 rpm. The processing for estimating the initial position is performed while the motor stops or rotates at such a low speed as to cause sufficiently little change in the magnetic pole position during a period required for the estimation processing.

When, in step 2003, control unit 220 determines that the condition for performing the initial position estimation processing is not satisfied, in other words, when the motor rotation speed is above the predetermined speed, control unit 220 repeats the processing in step 2003. Then, when determining that the condition for performing this processing is satisfied (when Motor Rotation Speed≤ Predetermined Speed holds), the operation proceeds to step 2004.

Alternatively, when, in step 2003, determining that the condition for performing the initial position estimation processing is not satisfied, control unit 220 may determine that the initial position cannot be estimated, and may then perform positioning processing for rotating brushless motor 100 to a predetermined position and fixing brushless motor 100 at the position.

In step 2004, control unit 220 performs the processing for estimating the initial position of brushless motor 100, and determines which energization mode to employ at the drive start in accordance with the initial position that is estimated through this estimation processing. Then, control unit 220 starts the drive of brushless motor 100 based on the determination.

The outline of the initial position estimation processing is as follows. An electric current is supplied to brushless motor 100 that is kept from rotating while the energization modes are sequentially switched from one to another, and the pulse induced voltage induced in a non-energized phase (open-circuit phase) in each energization mode is acquired.

Then, differences in pulse induced voltages between the energization modes are calculated in predetermined combinations of the energization modes. After that, the initial position of brushless motor 100 is detected from the comparison result of the levels of these differences. When the initial position (stop position) of brushless motor 100 is detected, then the optimum energization mode to employ when the drive of brushless motor 100 starts from this initial position is determined accordingly.

When the rotation of brushless motor 100 starts, the operation proceeds to step 2005, in which control unit 220 drives brushless motor 100 by the aforementioned sensorless control, in other words, by the square-wave drive method for a low rotation speed range and by the sine-wave drive method for a high rotation speed range.

Figure 10:
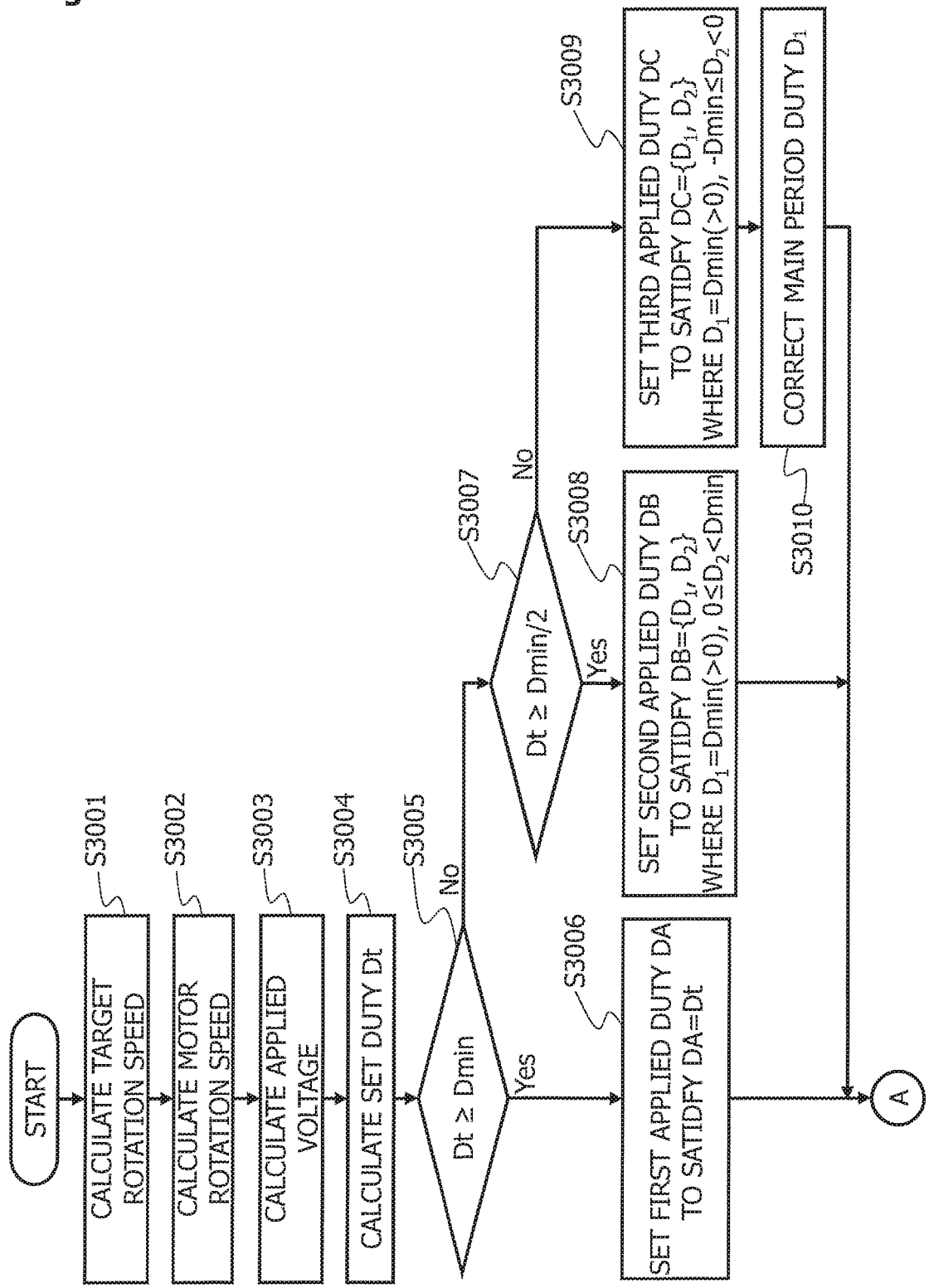
FIG. 10 is a flowchart exemplifying the first half of a sensorless control subroutine.

The flowchart of FIG. 10 represents the first half of the subroutine of the sensorless control using rotation speed feedback in step 2005 of the flowchart of FIG. 9.

In step 3001, applied voltage calculating unit 302 calculates the target rotation speed for brushless motor 100.

Figure 11:
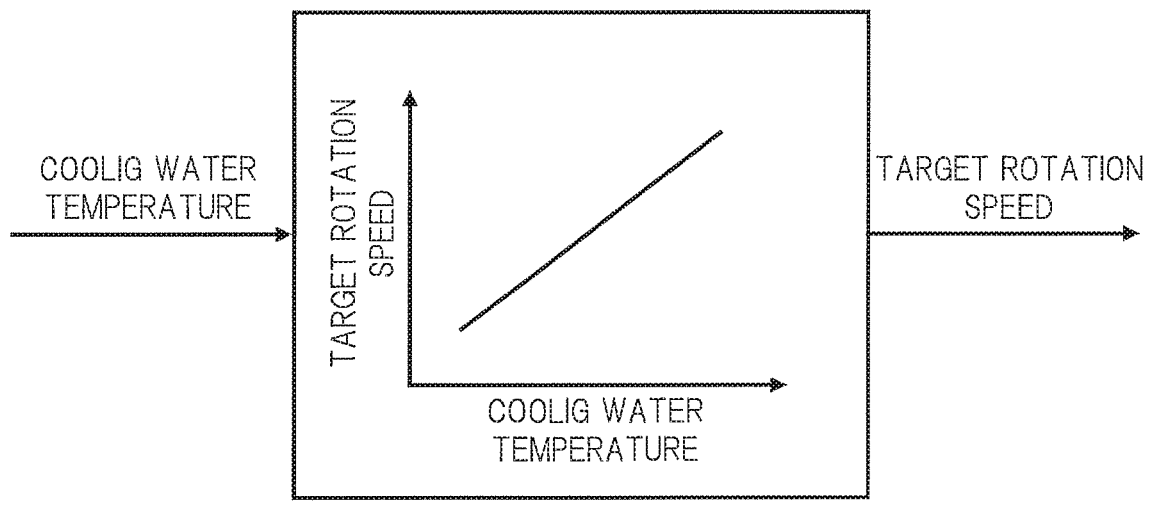
FIG. 11 illustrates an example of calculation of the target rotation speed.

As illustrated in FIG. 11, for example, for brushless motor 100 for rotationally driving electric water pump 26 according to this embodiment, the target rotation speed can be set higher along with an increase in the temperature of the cooling water flowing through first cooling water passage 12, second cooling water passage 18 or bypass passage 20 in the cooling system. When brushless motor 100 drives a hydraulic pump for supplying an oil pressure to an automatic transmission or the like, the target rotation speed is set higher along with an increase in the oil temperature (automatic transmission fluid (ATF) oil temperature).

In the cooling system of FIG. 1, motor controller 200 (control unit 220) calculates the target rotation speed based on cooling water temperature information received from ECU 38 via communication. Alternatively, ECU 38 may calculate the target rotation speed, and then input a signal indicating the calculated target rotation speed to motor controller 200 (control unit 220) via communication.

In step 3002, applied voltage calculating unit 302 calculates a motor rotation speed based on the switching cycle of the energization modes. Specifically, applied voltage calculating unit 302 measures time intervals between the time points of switching between the energization modes, by using the mode switching trigger outputted by comparing unit 310, and calculates a motor rotation speed from these time intervals. For example, when the number of pole pairs of brushless motor 100 is three, the motor rotation speed may be calculated from the formula [Rotation Speed=60/3/Time Intervals].

In step 3003, applied voltage calculating unit 302 calculates an applied voltage (input voltage) command value based on the target rotation speed calculated in step 3001 and the motor rotation speed calculated in step 3002.

For example, the applied voltage (input voltage) command value is determined according to the following equation by proportional-integral control (PI control) based on the difference between the target rotation speed and the motor rotation speed.

Applied Voltage=Rotation Speed Difference*Proportional Gain+Integral Value of Rotation Speed Difference*Integral Gain Rotation Speed Difference=Target Rotation Speed− Motor Rotation Speed However, the method of determining the applied voltage command value is not limited to that based on the target rotation speed and the motor rotation speed, but may be any known determination method that is appropriately selected. Examples of such determination methods include a method of determining the applied voltage command value based on a difference between the target discharge pressure and the actual discharge pressure of electric water pump 26, and a method of determining the applied voltage command value based on a required torque. The calculation method of an applied voltage for bringing the actual applied voltage closer to its target value is not limited to the proportional-integral control, but may be any known calculation method that is appropriately selected, such as proportional-integral-derivative control (PID control).

In step 3004, PWM generating unit 304 calculates the set duty Dt based on the applied voltage (input voltage) determined in step 3003. The set duty Dt (%) is a set duty value to be applied to brushless motor 100, and, specifically, calculated from the following equation.

Set Duty $Dt$=Applied Voltage/Power Supply Voltage $V_B$*100

In step 3005, PWM generating unit 304 determines whether or not Set Duty Dt≥ Minimum Duty Dmin holds.

Here, as described above, the minimum duty Dmin is the minimum value (>0) for the duty that allows the pulse induced voltage in a non-energized phase to be detected without being affected by ringing. The duty is a ratio of an application time of the pulse voltage, that is, a ratio of a time for which the PWM signal is set to the voltage level that turns ON switching elements 214a to 214f. The minimum duty Dmin may be calculated based on the actual measurements of the ringing period, the sampling time or the like, or previously stored in read only memory (ROM).

For example, the minimum duty Dmin may be set twice as long as the longer one of the ringing period and the sampling time when, as shown in FIG. 5, the sampling (ND conversion) of a pulse induced voltage in a non-energized phase is started at timing corresponding to the low peak of the carrier signal that falls and rises during each carrier period in the PWM control, in other words, at timing corresponding to approximately the center of the pulse width of PWM signal. This minimum duty Dmin setting prevents the sampling from being performed within the ringing period, and prevents pulse voltage application between two phases from stopping during the sampling. In this case, the minimum duty Dmin may be set as represented by the following equation.

$D$min=max(Ringing Period, Sampling Time)*2/Carrier Periods*100

Alternatively, for example, the minimum duty Dmin may be calculated as represented by the following equation when, as shown in FIG. 6, the sampling is started immediately after the elapse of the ringing period as described above. This minimum duty Dmin setting also prevents the sampling from being performed within the ringing period, and prevents pulse voltage application between two phases from stopping during the sampling.

$D$min=(Ringing Period+Sampling Time)/Carrier Periods*100

Note that the pulse induced voltage in a non-energized phase changes in magnitude according to the duty of the pulse voltage. Thus, too low duty might cause the pulse induced voltage to fall below voltage detection resolution, and thus might make it impossible to determine whether or not the energization mode switching timing has come. To address this risk, the minimum duty Dmin may be set to the minimum duty that generates the pulse induced voltage above voltage detection resolution, as needed.

In step 3005, when PWM generating unit 304 determines that Set Duty Dt≥ Minimum Duty Dmin holds (Yes), the operation proceeds to step 3006. On the other hand, when PWM generating unit 304 determines that Set Duty Dt≥ Minimum Duty Dmin does not hold, in other words, that Set Duty Dt< Minimum Duty Dmin holds (No), the operation proceeds to step 3007 so as to prevent the pulse induced voltage from being sampled within the ringing period.

In step 3006, PWM generating unit 304 sets the set duty Dt calculated in step 3004 as a first applied duty DA, and transmits the PWM signal having the first applied duty DA (=Dt) to gate signal switching unit 306. Here, the first applied duty DA is a duty of the PWM signal actually applied to switching elements 214a to 214f.

Figure 12:
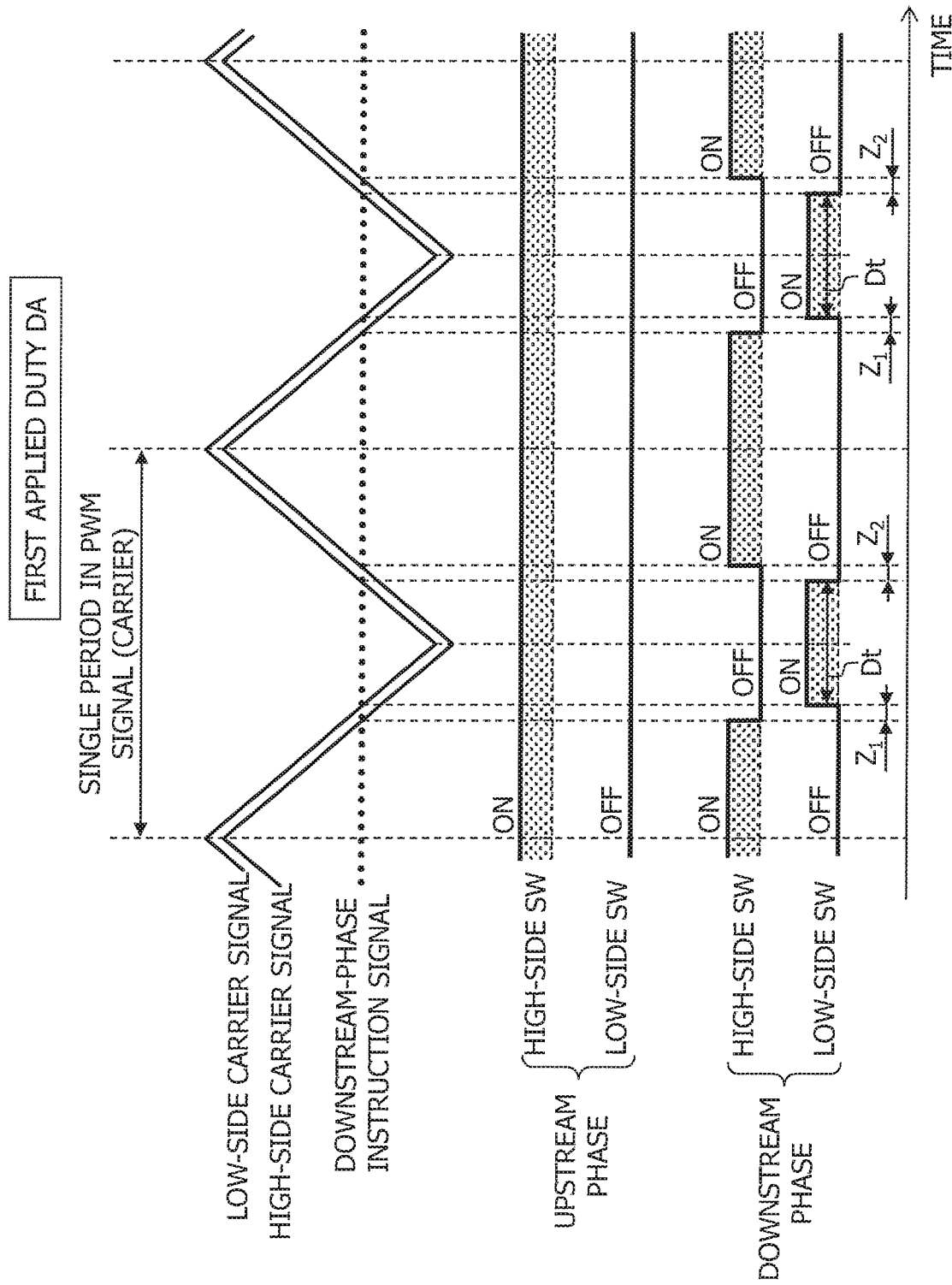
FIG. 12 is a time chart illustrating first applied duty setting.

In each of the energization modes, two of the three phases are supplied with an electric current. Specifically, in each energization mode, a high-side switching element (hereinafter referred to as "upstream-phase high-side SW") connected to one of the two phases that is located upstream in the electric current direction is turned ON while a low-side switching element (hereinafter referred to as "downstream-phase low-side SW") connected to the other phase, which is located downstream, is switched between ON and OFF. In any of these energization modes, setting the first applied duty DA causes the PWM signal whose ON-time ratio is defined by the set duty Dt to be applied, as the gate signal, to the control terminal of the downstream-phase low-side SW as illustrated in FIG. 12. For example, in the energization mode M3 for turning ON high-side switching element 214c connected to the V-phase while switching low-side switching element 214f connected to the W-phase between ON and OFF, the PWM signal defined by the set duty Dt is applied, as the gate signal, to the control terminal of switching element 214f.

In generating the PWM signal, PWM generating unit 304 uses the complementary PWM method so as to let a current flow from the upstream phase to the downstream phase. Specifically, PWM generating unit 304 also generates a complementary PWM signal (an example of the pulse width modulation signal in the claims) for a high-side switching element (hereinafter referred to as "downstream-phase high-side SW") connected to one of the two phases that is located downstream. The complementary PWM signal has a phase opposite to that of the PWM signal applied to the downstream-phase low-side SW, as illustrated in FIG. 12. This allows the downstream-phase high-side SW to be turned OFF while the downstream-phase low-side SW is turned ON, and allows the downstream-phase high-side SW to be ON while the downstream-phase low-side SW is turned OFF. For example, in the energization mode M3, the complementary PWM signal whose phase is opposite to that of the PWM signal applied to W-phase low-side switching element 214f is applied to W-phase high-side switching element 214e.

The reason why the complementary PWM method is used in generating the PWM signal will be described by using the energization mode M3 as an example. When W-phase low-side switching element 214f, which is located downstream, is turned OFF from ON, the current tends to flow in the same direction as it did, thus tending to start to flow through diode 212e connected in antiparallel to W-phase high-side switching element 214e. However, turning ON switching element 214e forces the current to flow through the switching part (FET channel, for example) of switching element 212e since the forward resistance of diode 212e is larger than the ON resistance of the switching part of switching element 214e. This reduces electric current loss due to heat generation.

Also, to avoid arm short circuit, which is caused when the ON period of the downstream-phase high-side SW overlaps with the ON period of the downstream-phase low-side SW, PWM generating unit 304 provides the PWM signal with a first dead-time period $Z_1$ and a second dead-time period $Z_2$ as illustrated in FIG. 12. Specifically, both the downstream-phase high-side SW and the downstream-phase low-side SW are turned OFF during each of the first dead-time period $Z_1$ and the second dead-time period $Z_2$. The first dead-time period $Z_1$ is provided between the ON-to-OFF switching timing of the downstream-phase high-side SW and the OFF-to-ON switching timing of the downstream-phase low-side SW, while the second dead-time period $Z_2$ is provided between the ON-to-OFF switching timing of the downstream-phase low-side SW and the OFF-to-ON switching timing of the downstream-phase high-side SW.

As illustrated in FIG. 12, the PWM signal to be applied to the downstream-phase low-side SW can be generated by comparing a value of a low-side carrier signal and a value of a downstream-phase instruction signal. The downstream-phase instruction signal is used for generating the PWM signal applied to a switching element connected to a downstream phase. Meanwhile, the complementary PWM signal to be applied to the downstream-phase high-side SW can be generated by comparing a value of a high-side carrier signal and a value of the downstream-phase instruction signal. The high-side carrier signal has a voltage level offset from that of the low-side carrier signal so as to provide the dead-time periods.

Similarly, main period duty setting unit 318 and adjustment period duty setting unit 320 also employ the complementary PWM method and the dead-time period provision as described above respectively for setting a second applied duty and for setting a third applied duty.

In step 3007, PWM generating unit 304 determines whether or not Set Duty Dt≥Dmin/2 holds. According to the relational expression of Dt=($D_1$+$D_2$)/2=(Dmin+$D_2$)/2, Set Duty Dt=Dmin/2 (second predetermined value) holds when the adjustment period duty $D_2$ is zero. Thus, the determination in step 3007 is equivalent to the determination of whether or not Adjustment Period Duty $D_2$≥0 holds.

When PWM generating unit 304 determines that Set Duty Dt≥Dmin/2 holds (Yes) in step 3007, the operation proceeds to step 3008. On the other hand, when PWM generating unit 304 determines that Set Duty Dt≥Minimum Duty Dmin/2 does not hold, in other words, that Set Duty Dt<Minimum Duty Dmin/2 holds (No), the operation proceeds to step 3009.

In step 3008, main period duty setting unit 318 and adjustment period duty setting unit 320 respectively set the main period duty $D_1$ and the adjustment period duty $D_2$ constituting a second applied duty DB, and the PWM signal having the second applied duty DB is transmitted to duty correcting unit 322.

In this event, the main period duty $D_1$ is set to the minimum duty Dmin so as not to sample a pulse induced voltage within the ringing period. In addition, the adjustment period duty $D_2$ is calculated according to the set duty Dt within the range where 0≤$D_2$≤5 Dmin holds ($D_2$=2×Dt−Dmin).

Figure 13:
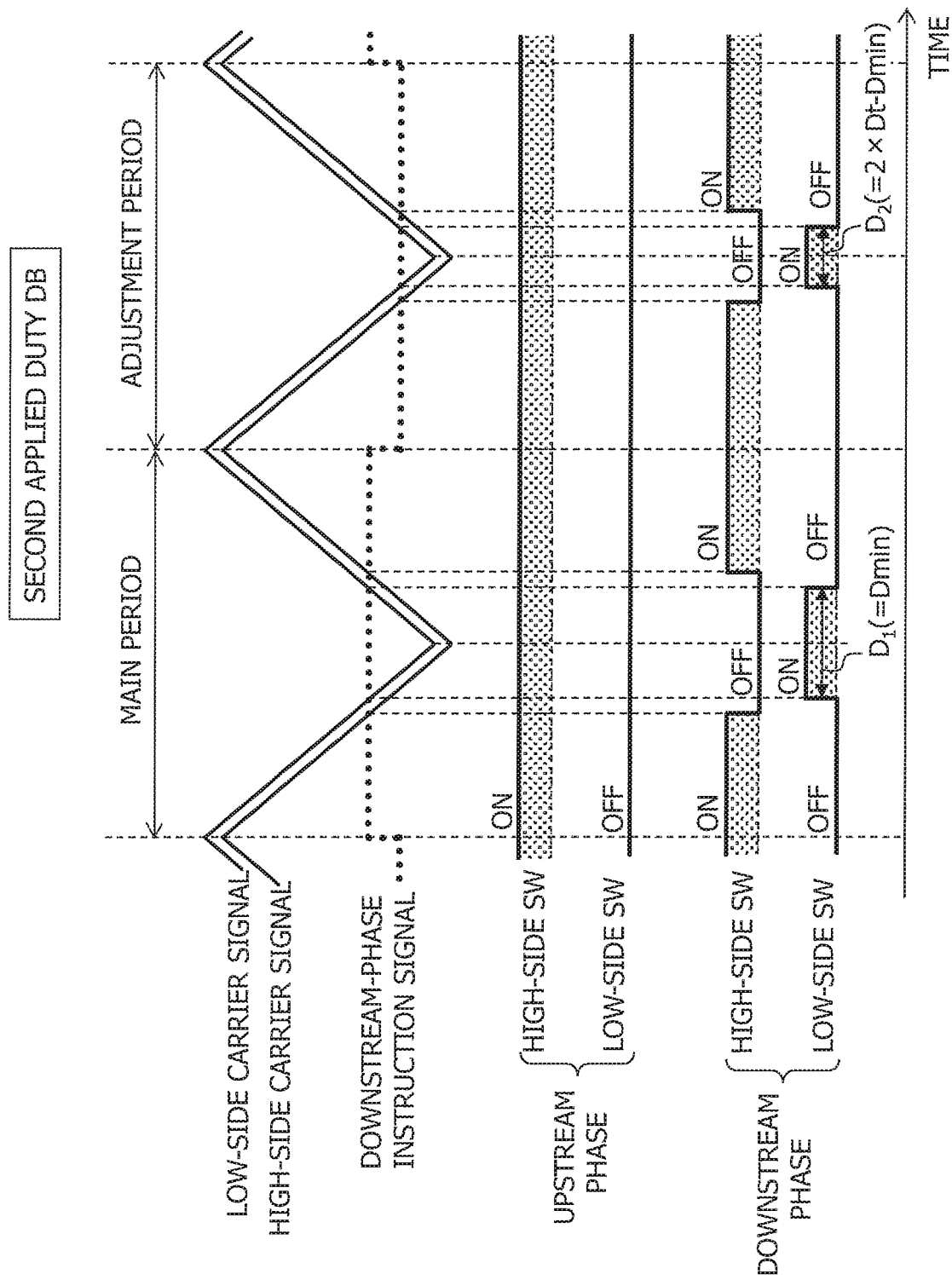
FIG. 13 is a time chart illustrating second applied duty setting.

Setting the second applied duty DB allows the following PWM signal application as illustrated in FIG. 13 in any of the energization modes. Specifically, during the main period, the PWM signal whose ON-time ratio is defined by the minimum duty Dmin is applied, as the gate signal, to the control terminal of the downstream-phase low-side SW. During the adjustment period, the PWM signal whose ON-time ratio is defined by the duty $D_2$ (=2×Dt−Dmin) is applied, as the gate signal, to the control terminal of the downstream-phase low-side SW, by changing the value of the downstream-phase instruction signal. For example, in the energization mode M3 for turning ON high-side switching element 214c connected to the V-phase while switching low-side switching element 214f connected to the W-phase between ON and OFF, the PWM signal is applied as follows. During the main period, the PWM signal defined by the minimum duty Dmin is applied, as the gate signal, to the control terminal of switching element 214f. During the adjustment period, the PWM signal defined by the duty $D_2$ (=2×Dt−Dmin) is applied, as the gate signal, to the control terminal of the same switching element 214f.

Thus, in the second applied duty DB setting, sort of positive-side duty adjustment is performed. Specifically, during the main period, by switching between the energization modes, a torque is generated in a positive rotation direction, which is an intended rotation direction. During the adjustment period, by reducing the current as compared to that in the main period, a torque, which is reduced as compared to that in the main period, is generated in the same positive rotation direction. Thereby, the PWM signal defined by the set duty Dt which is less than the minimum duty Dmin but not less than Dmin/2 is substantially applied.

In step 3009, main period duty setting unit 318 and adjustment period duty setting unit 320 respectively set the main period duty $D_1$ and the adjustment period duty $D_2$ constituting a third applied duty DC, and the PWM signal having the third applied duty DC is transmitted to duty correcting unit 322. In the third applied duty DC, the main period duty $D_1$ is limited to the minimum duty Dmin, while the adjustment period duty $D_2$ satisfies −Dmin≤$D_2$<0, in other words, is set to a negative value not less than −Dmin.

Figure 14:
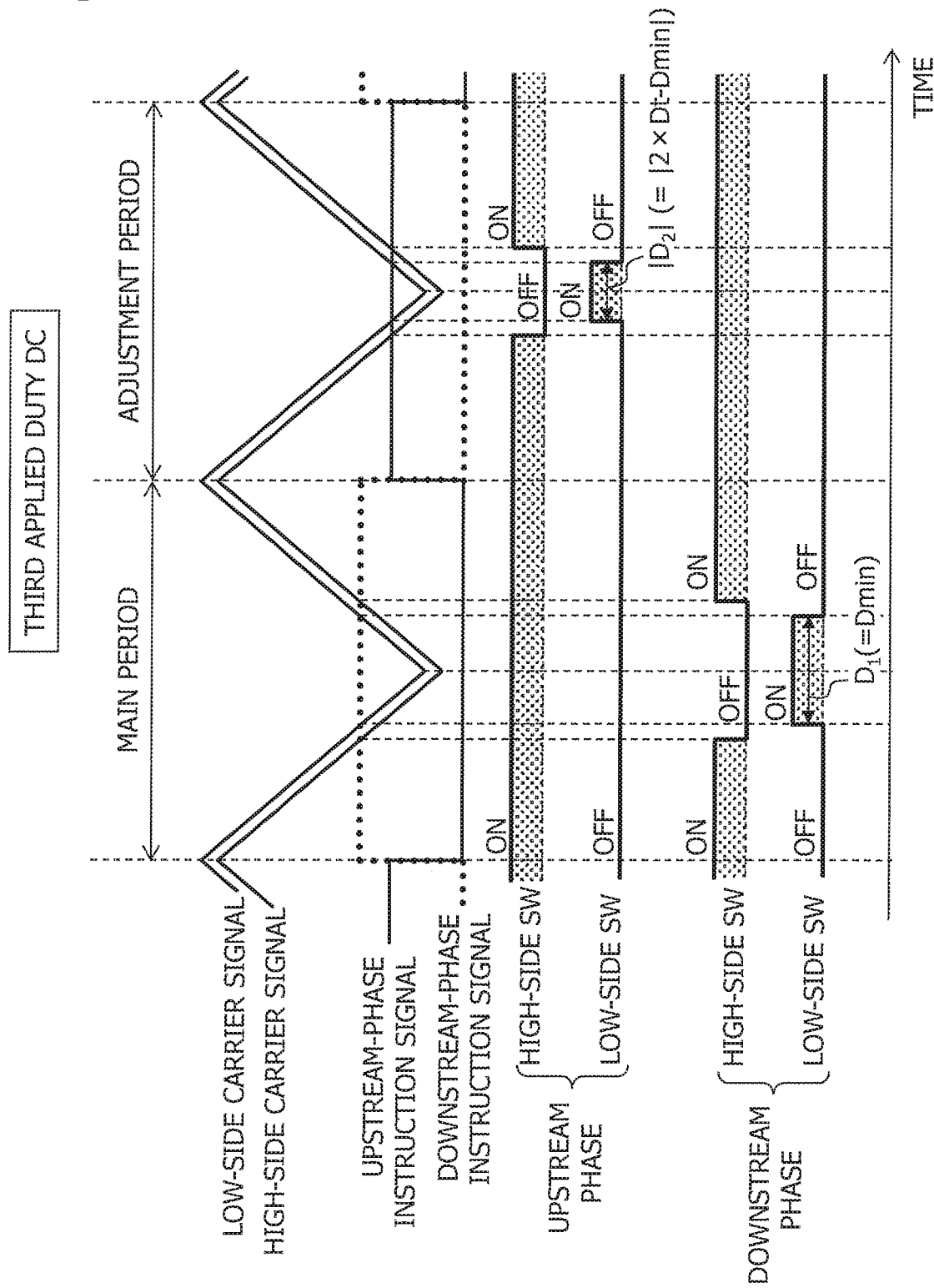
FIG. 14 is a time chart illustrating third applied duty setting.

Setting the third applied duty DC allows the following PWM signal application as illustrated in FIG. 14 in any of the energization modes. Specifically, during the main period, the PWM signal whose ON-time ratio is defined by the minimum duty Dmin is applied, as the gate signal, to the control terminal of the downstream-phase low-side SW, by comparing the value of the downstream-phase instruction signal and the value of the low-side carrier signal. Here, the downstream-phase instruction signal is changed to such a value as to cause the downstream-phase instruction signal to cross the low-side and high-side carrier signals, and the upstream-phase instruction signal is set to such a value as to prevent the upstream-phase instruction signal from crossing either of the low-side and high-side carrier signals.

During the adjustment period, the PWM signal whose ON-time ratio is defined by the duty $|D_2|$ ($=|2 \times Dt-Dmin|$) is applied, as the gate signal, to the control terminal of not the downstream-phase low-side SW but the upstream-phase low-side SW, by comparing the value of the upstream-phase instruction signal and the value of the low-side carrier signal. Here, the downstream-phase instruction signal is changed to such a value as to prevent the downstream-phase instruction signal from crossing either of the low-side and high-side carrier signals. Instead, the upstream-phase instruction signal is changed to such a value as to cause the upstream-phase instruction signal to cross the low-side and high-side carrier signals. During this adjustment period, the complementary PWM signal set to the ON level is applied to the control terminal of the downstream-phase high-side SW by the complementary PWM method. Accordingly, the downstream-phase high-side SW becomes upstream to the upstream-phase low-side SW. As a result, the voltage applied to the energized phases in the adjustment period is the reverse of that in the main period. For example, the energization mode M3 in the main period is switched to the energization mode M6 in the adjustment period.

Thus, in the third applied duty DC setting, sort of negative-side duty adjustment is performed. Specifically, during the main period, by switching between the energization modes, a torque is generated in the positive rotation direction, which is the intended rotation direction. During the adjustment period, a torque is generated in the negative rotation direction, which is opposite to the positive rotation direction. Thereby, the PWM signal defined by the set duty Dt which is less than Dmin/2 is substantially applied.

Figure 15:
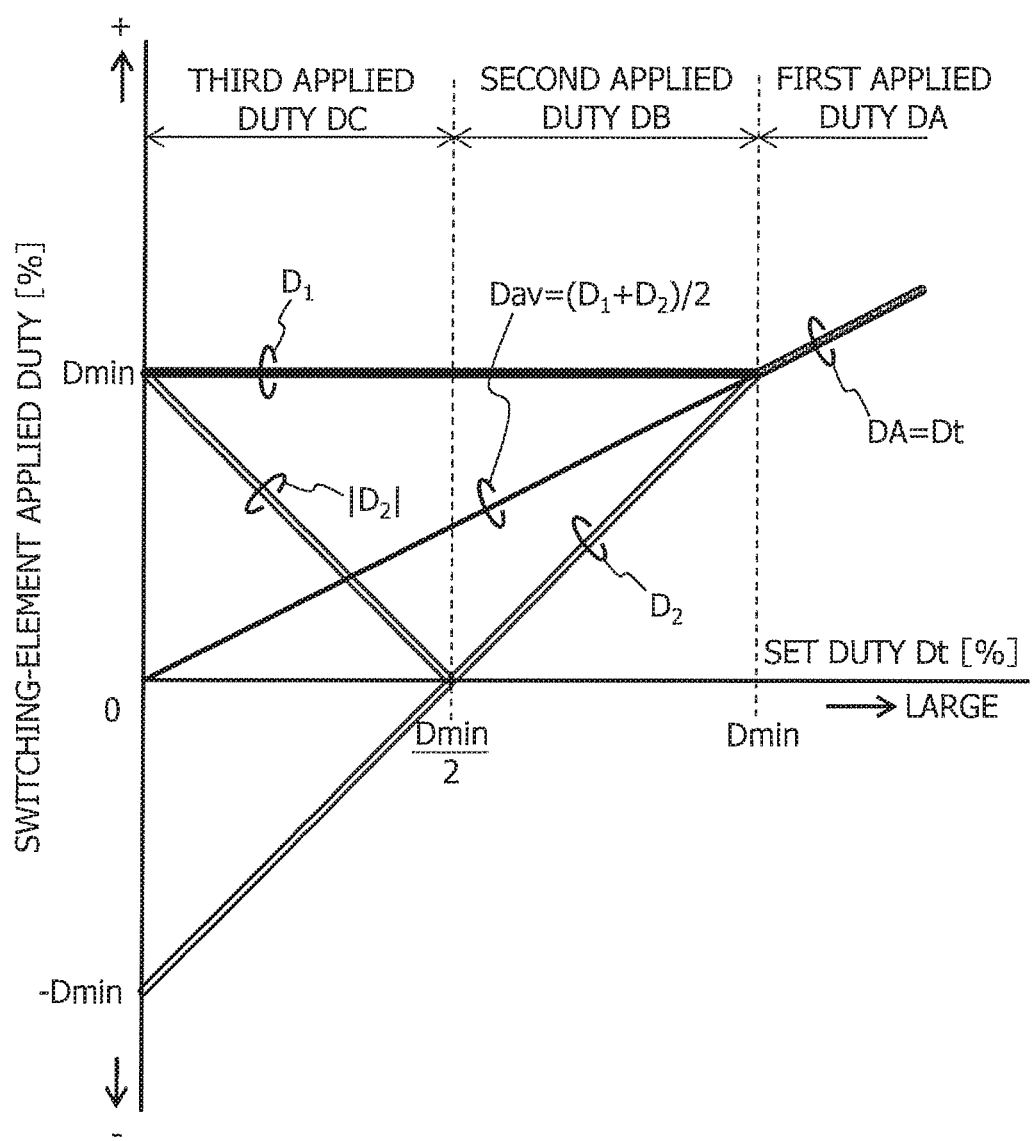
FIG. 15 is a duty setting chart illustrating applied duty setting.

FIG. 15 illustrates, with respect to the set duty Dt, the first applied duty DA, the second applied duty DB and the third applied duty DC described above as well as the average duty Day calculated from the main period duty $D_1$ and the adjustment period duty $D_2$.

In step 3010, duty correcting unit 322 corrects and increases the main period duty $D_1$ of the third applied duty DC set in step 3008.

Hereinafter, the significance of the correction to increase the main period duty $D_1$ performed by duty correcting unit 322 in step 3010 will be described.

Figure 16:
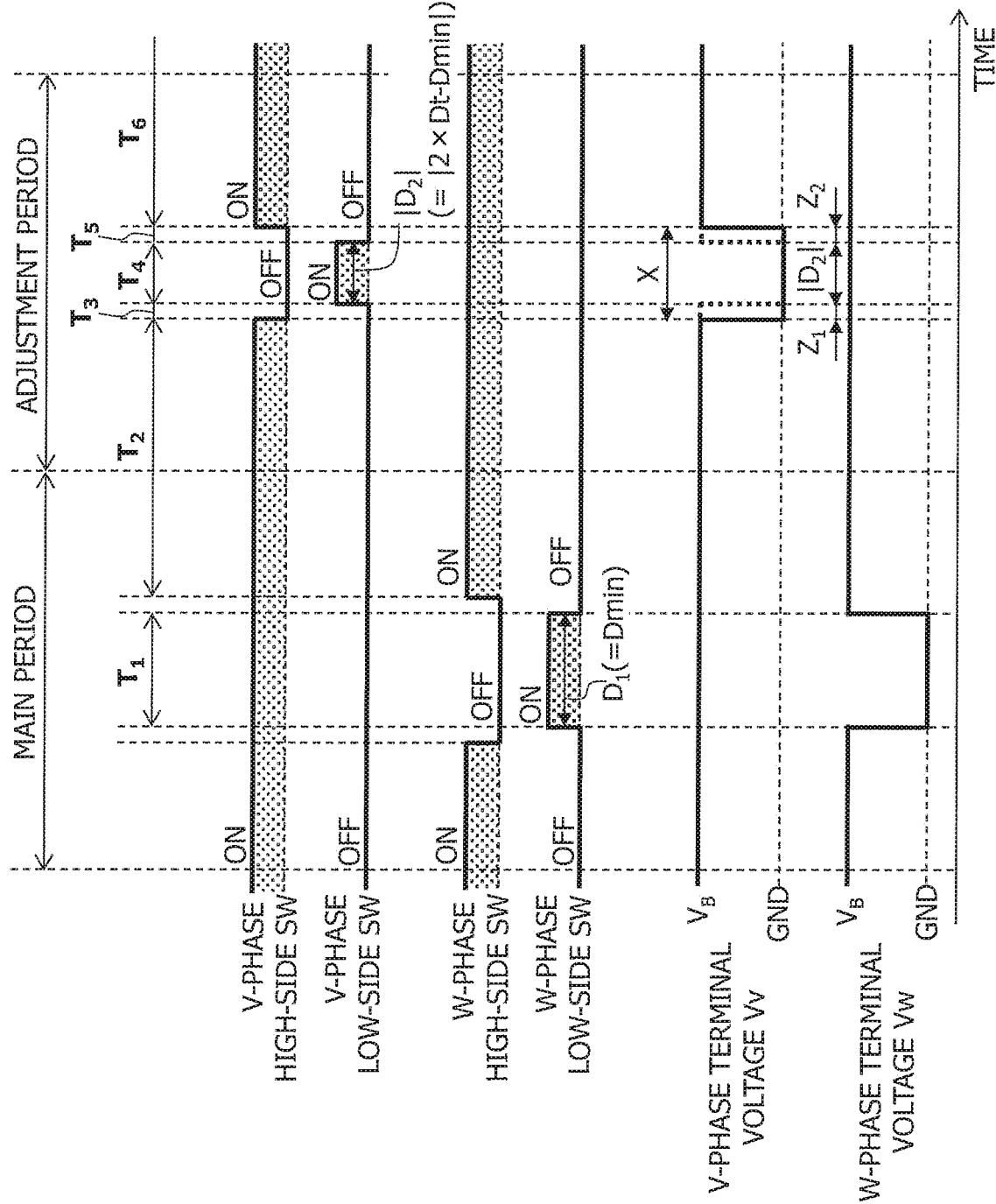
FIG. 16 is a time chart illustrating V-phase and W-phase terminal voltages in an energization mode M3 with the third applied duty setting.

In the following description, the energization mode M3 that causes a current to flow from the V-phase to the W-phase is used as an example. FIG. 16 illustrates a V-phase terminal voltage Vv and a W-phase terminal voltage Vw applied when the third applied duty DC is set in the energization mode M3. Note that the terminal voltage used herein refers not to a non-energized-phase terminal voltage based on a difference between a neutral point voltage and a ground (GND)-terminal voltage, but to the ground (GND)-terminal voltage.

In FIG. 16, periods $T_1$ to $T_6$ are defined as follows for convenience of explanation. During the period $T_1$, V-phase high-side switching element 214c and W-phase low-side switching element 214f are both turned ON according to the main period duty $D_1$. During the period $T_2$, V-phase high-side switching element 214c and W-phase high-side switching element 214e are both turned ON. During the period $T_3$, which is identical to the first dead-time period $Z_1$, only W-phase high-side switching element 214e is turned ON while V-phase high-side switching element 214c and low-side switching element 214d are both turned OFF. During the period $T_4$, V-phase low-side switching element 214d is turned ON while W-phase high-side switching element 214e is turned OFF according to the adjustment period duty $D_2$. During the period $T_5$, which is identical to the second dead-time period $Z_2$, only W-phase high-side switching element 214e is turned ON while V-phase high-side switching element 214c and low-side switching element 214d are both turned OFF. During the period $T_6$, V-phase high-side switching element 214c and W-phase high-side switching element 214e are both turned ON.

Figure 17:
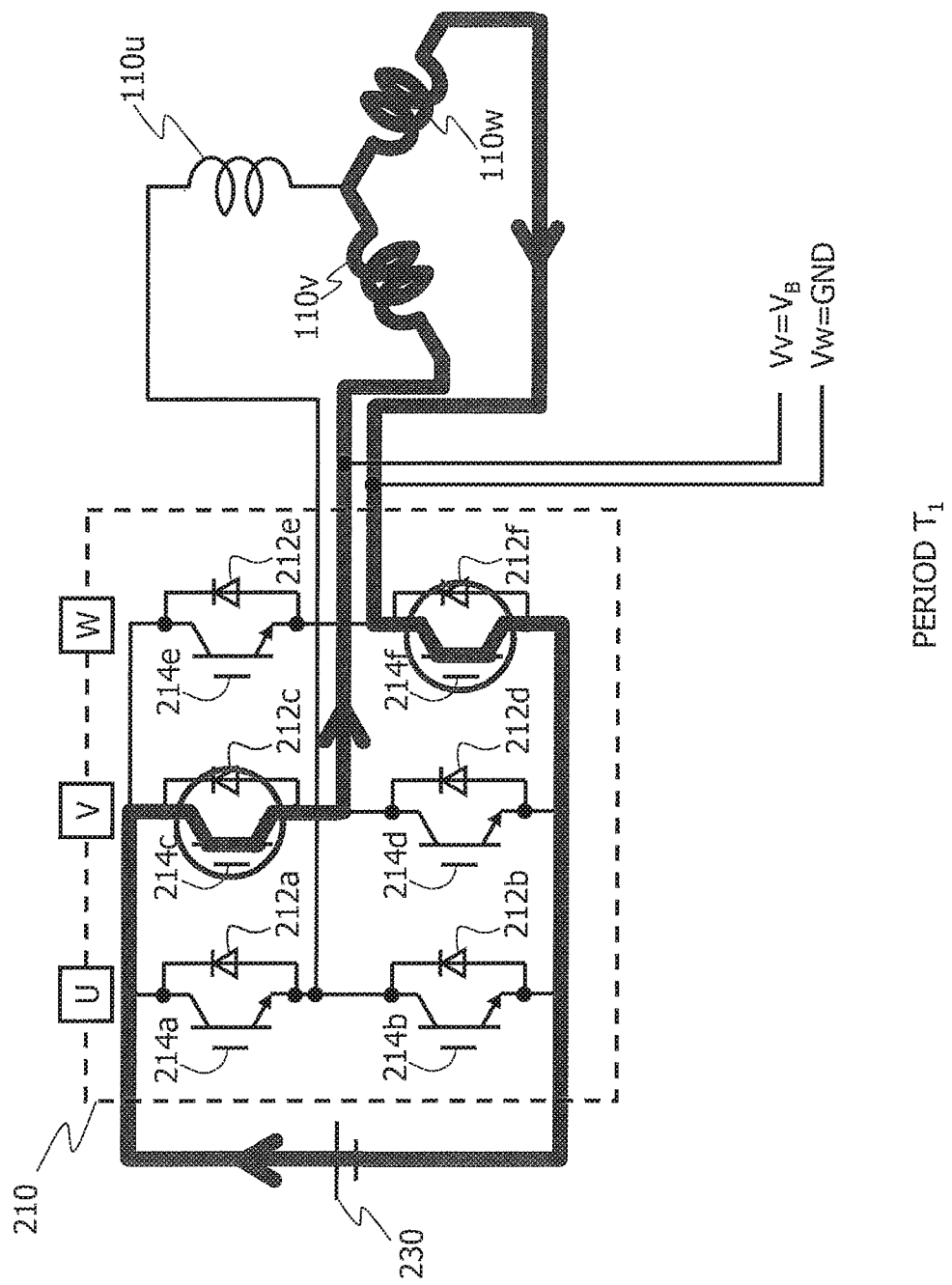
FIG. 17 is a circuit diagram illustrating the direction and magnitude of the electric current flow in the period $T_1$ of FIG. 16.

During the period $T_1$, as illustrated in FIG. 17, V-phase high-side switching element 214c and W-phase low-side switching element 214f are both turned ON (in FIG. 17, open circle is added to each ON-state switching element; the same is true for FIGS. 18 to 21). Accordingly, the power supply voltage $V_B$ is applied to both ends of the set of V-phase coil 110v and W-phase coil 110w with W-phase coil 110w being at the ground (GND) side. This causes a current to flow sequentially through V-phase coil 110v and W-phase coil 110w, so that the V-phase terminal voltage Vv becomes equivalent to the power supply voltage $V_B$, while the W-phase terminal voltage Vw becomes equivalent to the ground (GND) potential. Note that thick arrow of FIG. 17 indicates an electric current direction and has a width roughly representing magnitude of the electric current (the same is true for FIGS. 18 to 21).

Figure 18:
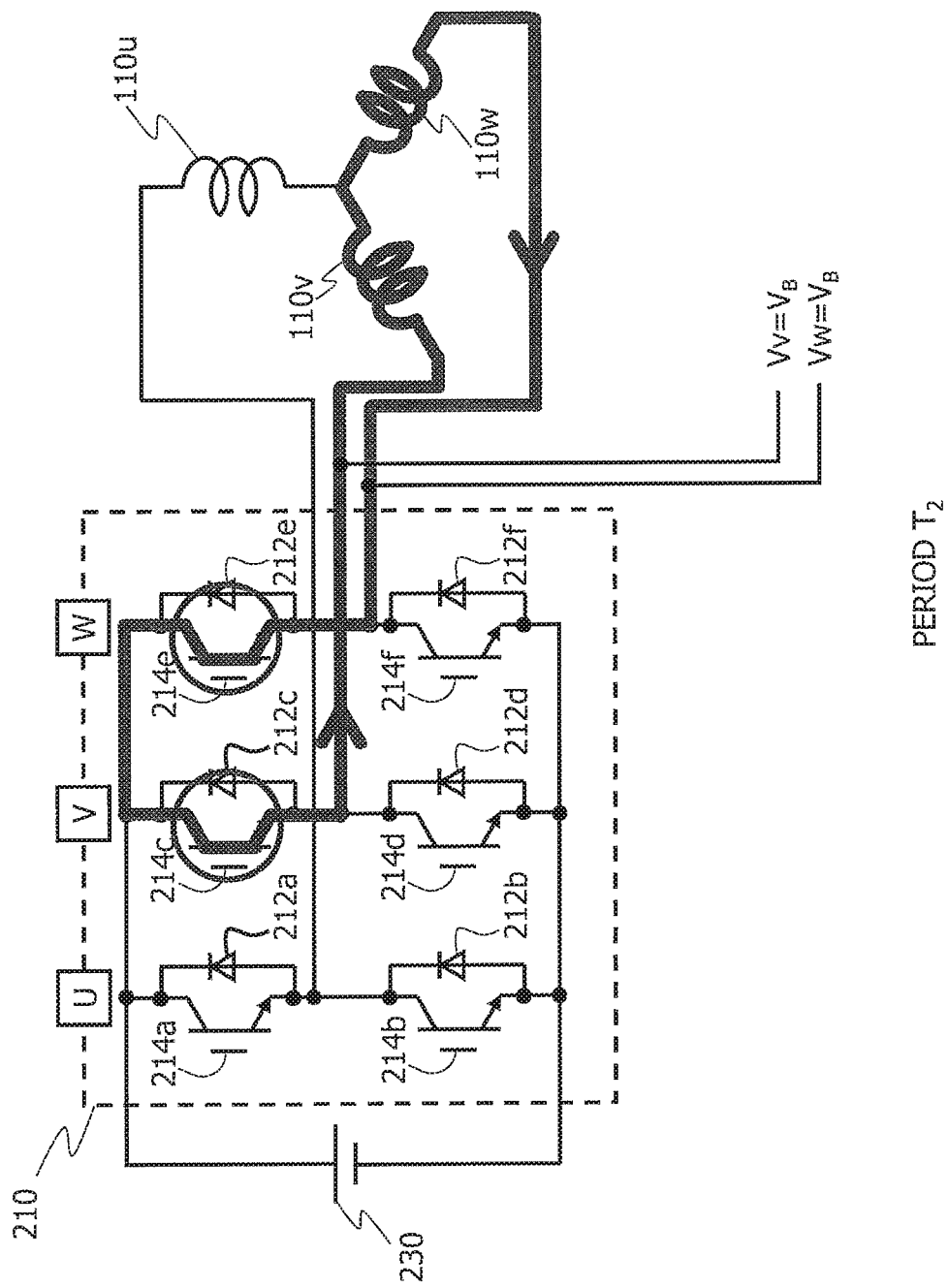
FIG. 18 is a circuit diagram illustrating the direction and magnitude of the electric current flow in the period $T_2$ of FIG. 16.

During the period $T_2$, W-phase low-side switching element 214f is switched to OFF. Accordingly, as illustrated in FIG. 18, the electric current flow in the period $T_1$, which passes sequentially through V-phase coil 110v and W-phase coil 110w to the ground (GND) side of power supply circuit 230 is blocked. However, W-phase high-side switching element 214e is turned ON, instead. Accordingly, the electric current flow sequentially through V-phase coil 110v and W-phase coil 110w is maintained since the current having flown through W-phase coil 110w flows sequentially through W-phase high-side switching element 214e and V-phase high-side switching element 214c, and returns to V-phase coil 110v. Moreover, the power supply voltage $V_B$ applied by power supply circuit 230 makes the V-phase terminal voltage Vv and the W-phase terminal voltage Vw equivalent to the power supply voltage $V_B$.

Figure 19:
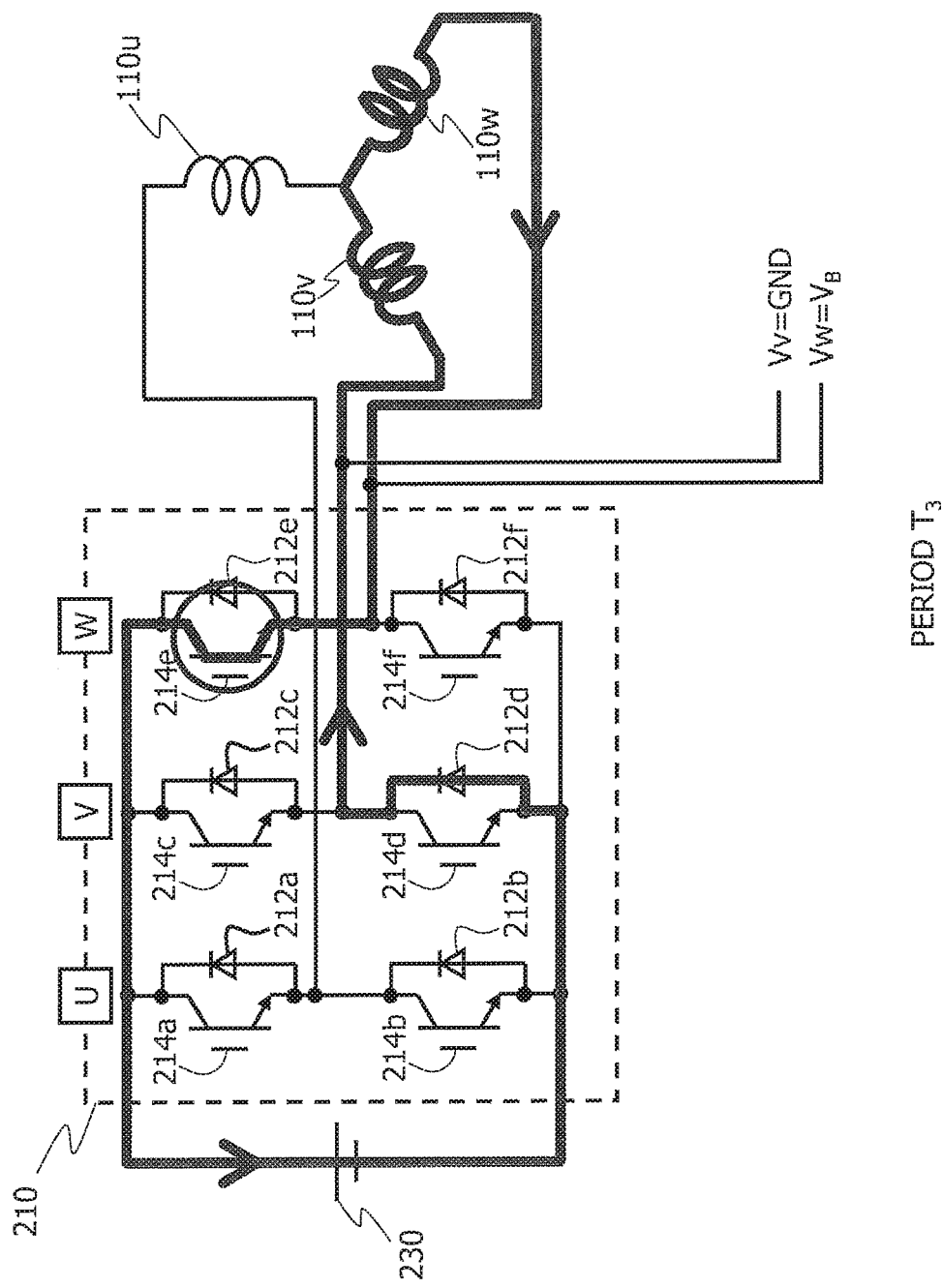
FIG. 19 is a circuit diagram illustrating the direction and magnitude of the electric current flow in the period $T_3$ of FIG. 16.

During the period $T_3$, that is, during the first dead-time period $Z_1$, V-phase high-side switching element 214c is switched to OFF as illustrated in FIG. 19. Accordingly, the current having flown sequentially through W-phase coil 110w and W-phase high-side switching element 214e flows through power supply circuit 230 and diode 212d, which is antiparallel to V-phase low-side switching element 214d, and returns to V-phase coil 110v. Thus, a circuit through diode 212d and W-phase high-side switching element 214e is formed between power supply circuit 230 and the set of V-phase coil 110v and W-phase coil 110w. Accordingly, power supply circuit 230 makes the V-phase terminal voltage Vv equivalent to the ground (GND) potential, and makes the W-phase terminal voltage Vw equivalent to the power supply voltage $V_B$. These terminal voltages gradually reduce the magnitude of the electric current flowing sequentially through V-phase coil 110v and W-phase coil 110w.

Figure 20:
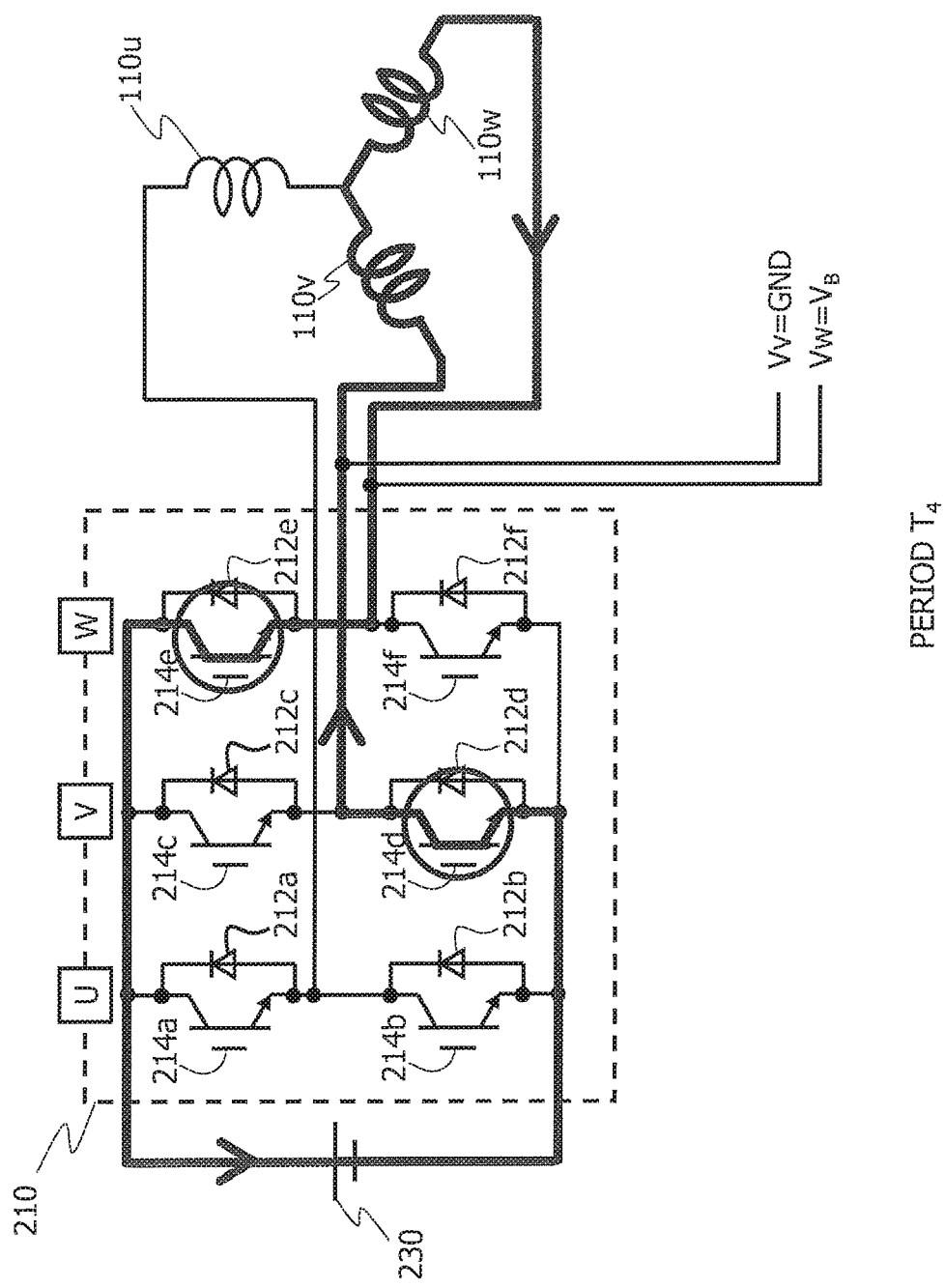
FIG. 20 is a circuit diagram illustrating the direction and magnitude of the electric current flow in the period $T_4$ of FIG. 16.

During the period $T_4$, as illustrated in FIG. 20, V-phase low-side switching element 214d is turned ON. As a result, the V-phase terminal voltage Vv becomes equivalent to the ground (GND) potential while the W-phase terminal voltage Vw becomes equivalent to the power supply voltage $V_B$. Thereby, a voltage, which is the reverse of that in the period $T_1$, is applied to both ends of the set of V-phase coil 110v and W-phase coil 110w. Here, if the adjustment period duty $D_2$ is set to a value that ensures a certain length of energization time, which is a time for which the power supply voltage $V_B$ is applied to both ends of the set of V-phase coil 110$v$ and W-phase coil 110$w$, the current will start to flow sequentially through W-phase coil 110$w$ and V-phase coil 110$v$. However, when the adjustment period duty $D_2$ is a small value satisfying $-Dmin \le D_2 < 0$, the current flowing sequentially through V-phase coil 110$v$ and W-phase coil 110$w$ is further reduced in magnitude as compared to in the periods $T_1$ to $T_3$, but the electric current flow sequentially through W-phase coil 110$w$ and V-phase coil 110$v$ is not actually caused.

Figure 21:
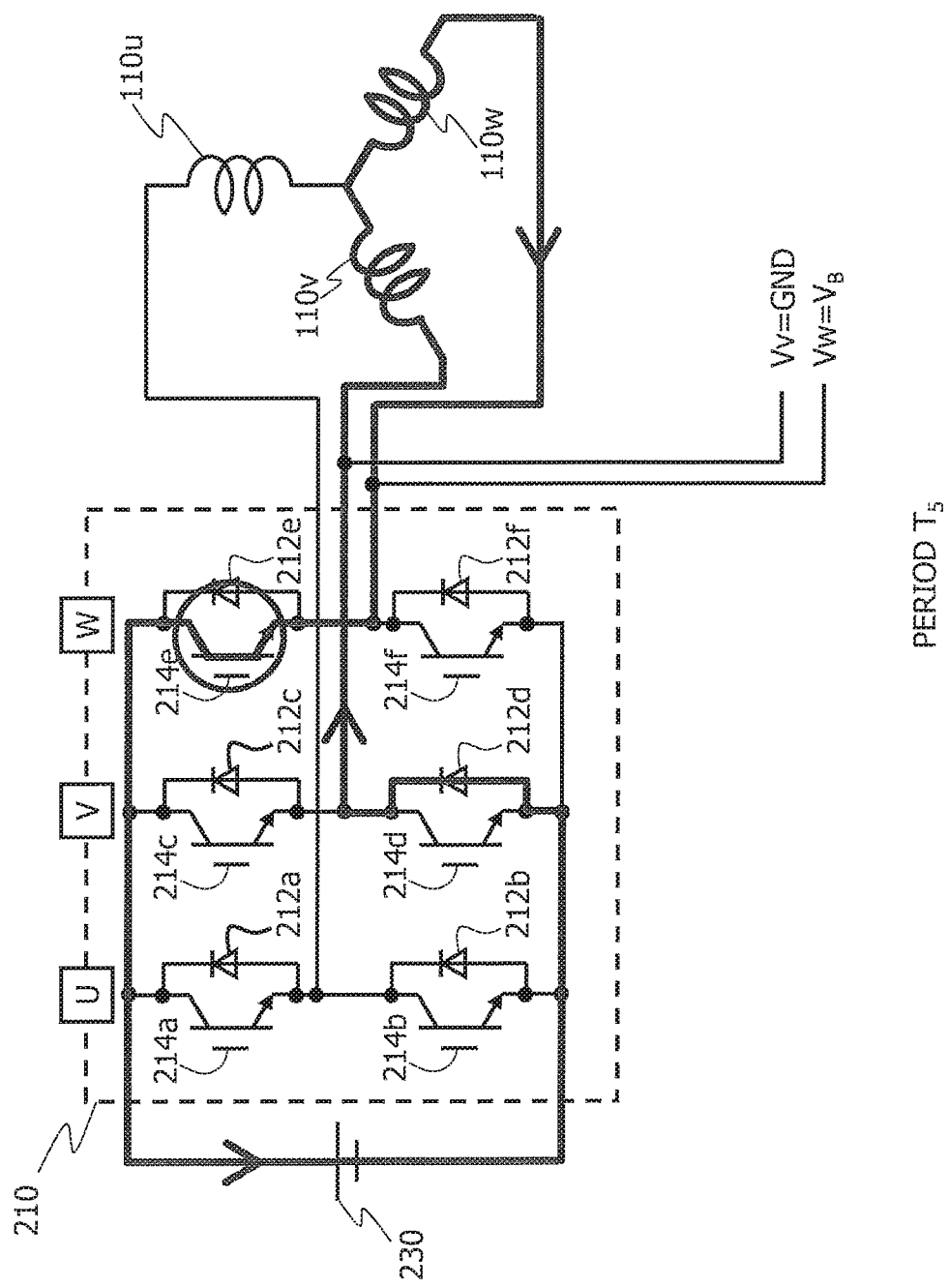
FIG. 21 is a circuit diagram illustrating the direction and magnitude of the electric current flow in the period $T_5$ of FIG. 16.

During the period $T_5$, that is, during the second dead-time period $Z_2$, V-phase low-side switching element 214$d$ is switched to OFF. Thus, the electric current route in the period $T_5$ is the same as that in the period $T_3$ (see FIG. 19) as illustrated in FIG. 21, if the electric current direction is not reversed in the period $T_4$. Accordingly, the V-phase terminal voltage Vv becomes equivalent to the ground (GND) potential, and the W-phase terminal voltage Vw becomes equivalent to the power supply voltage $V_B$. These terminal voltages further reduce the magnitude of the electric current flowing sequentially through V-phase coil 110$v$ and W-phase coil 110$w$ as compared to the period $T_4$.

Figure 22:
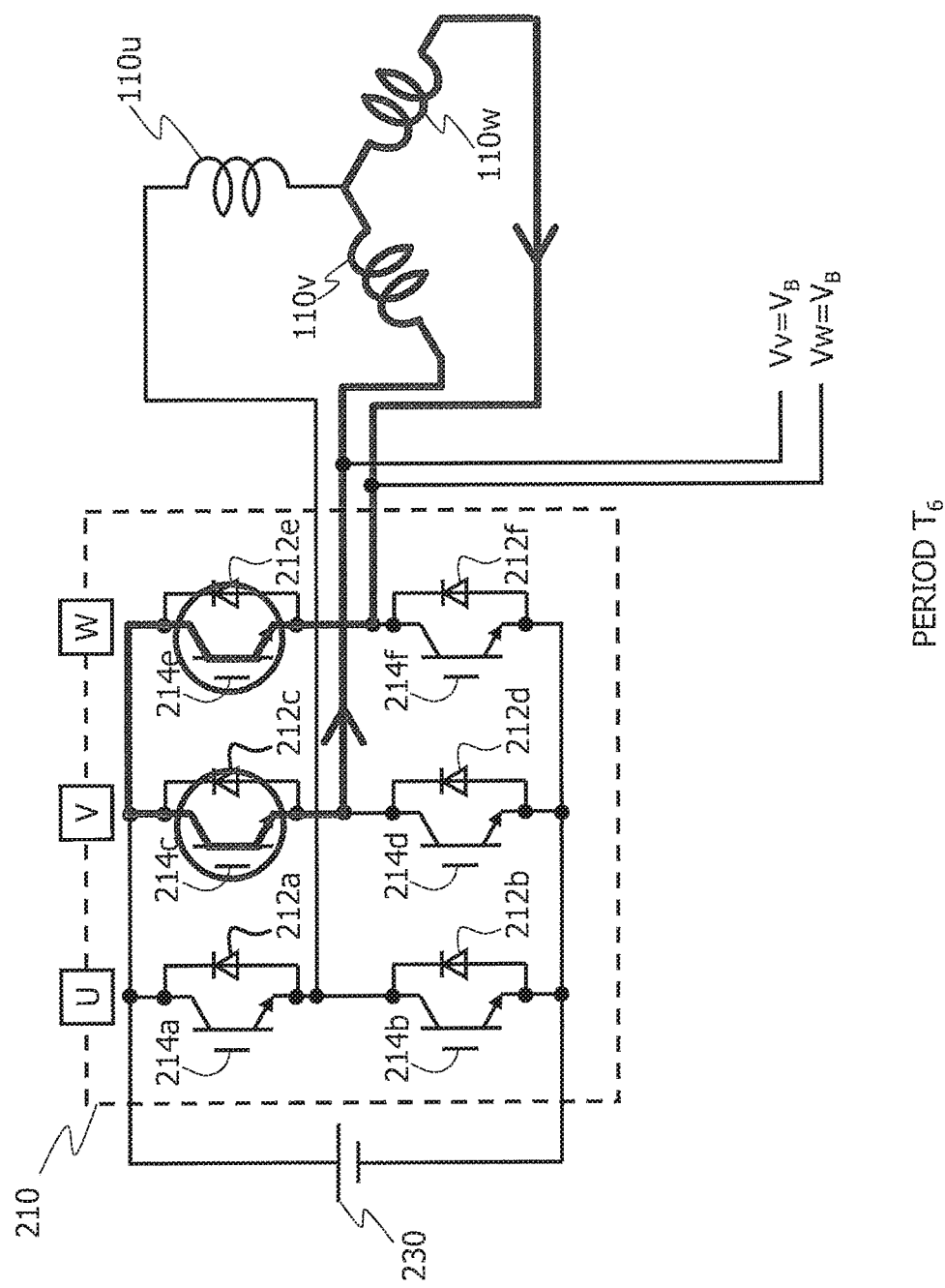
FIG. 22 is a circuit diagram illustrating the direction and magnitude of the electric current flow in the period $T_6$ of FIG. 16.

In the period $T_6$, the electric current route becomes the same as that in the period $T_2$ (see FIG. 18) as illustrated in FIG. 22, if the electric current direction is not reversed in the period $T_5$. The power supply voltage $V_B$ applied by power supply circuit 230 makes the V-phase terminal voltage Vv and the W-phase terminal voltage Vw equivalent to the power supply voltage $V_B$.

With reference again to FIG. 16, the V-phase terminal voltage Vv is equivalent to the ground (GND) electric potential in the period $T_4$, corresponding to the absolute value $|D_2|$ of the adjustment period duty $D_2$. On the other hand, the V-phase terminal voltage Vv is expected to be equivalent to the power supply voltage $V_B$ in each of the periods $T_3$ and $T_5$, which are the dead-time periods $Z_1$ and $Z_2$, since only W-phase high-side switching element 214$e$ is turned ON during the periods $T_3$ and $T_5$. Thus, among the periods $T_3$ to $T_5$, presumably only in the period $T_4$ corresponding to the absolute value $|D_2|$, energization is maintained, that is, the power supply voltage $V_B$ is applied to both ends of the set of V-phase coil 110$v$ and W-phase coil 110$w$ with V-phase coil 110$v$ being at the ground (GND) side of power supply circuit 230.

However, in fact, during the periods $T_3$ and $T_5$, which are the dead-time periods $Z_1$ and $Z_2$, there is formed a circuit via which a current flows through power supply circuit 230, V-phase coil 110$v$ and W-phase coil 110$w$, as described above. As a result, the V-phase terminal voltage Vv becomes equivalent to the ground (GND) potential, contrary to the original intention. Thus, the length of the actual energization time X in the adjustment period is increased to a length equal to the sum of time corresponding to the absolute value $|D_2|$ of the adjustment period duty $D_2$ and the dead-time periods $Z_1$ and $Z_2$. The amount of reverse torque generated in the direction opposite to that during the main period, or the torque reduction amount from the torque generated during the main period is greater than expected.

Figure 23:
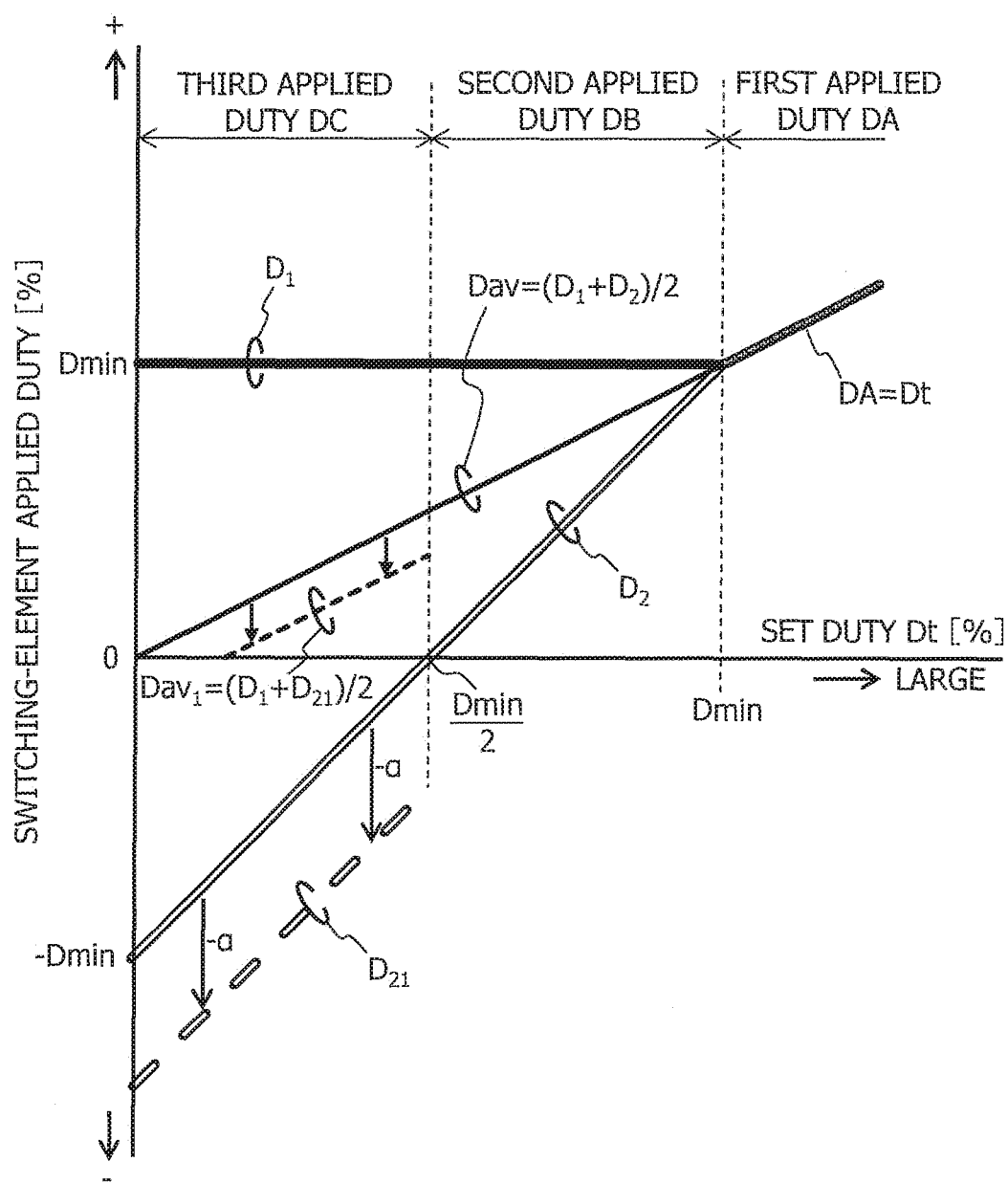
FIG. 23 is a duty setting chart illustrating how an adjustment period duty is actually reduced.

Thus, as illustrated in FIG. 23, in the third applied duty DC, where the adjustment period duty $D_2$ takes a negative value, an actual value of the adjustment period duty $D_2$ is an actual adjustment period duty $D_{21}$ (indicated by open chain lines in FIGS. 23 and 24) which is obtained by reducing the adjustment period duty $D_2$ by a corresponding to the dead-time periods $Z_1$ and $Z_2$. Also, an actual value of the average duty Day, which is calculated from the main period duty $D_1$ and the adjustment period duty $D_2$, is an actual average duty Dav$_1$ (indicated by dashed lines in FIGS. 23 and 24) which is calculated from the main period duty $D_1$ and the actual adjustment period duty $D_{21}$, and reduced as compared to the average duty Day. Thus, when the value of the adjustment period duty $D_2$ changes from positive to negative, a gap, during which the motor rotation speed drops quickly, occurs. When rotation speed feedback control is performed with the presence of such a gap, the hunting of the motor rotation speed might occur depending on the value of the set duty Dt.

Figure 24:
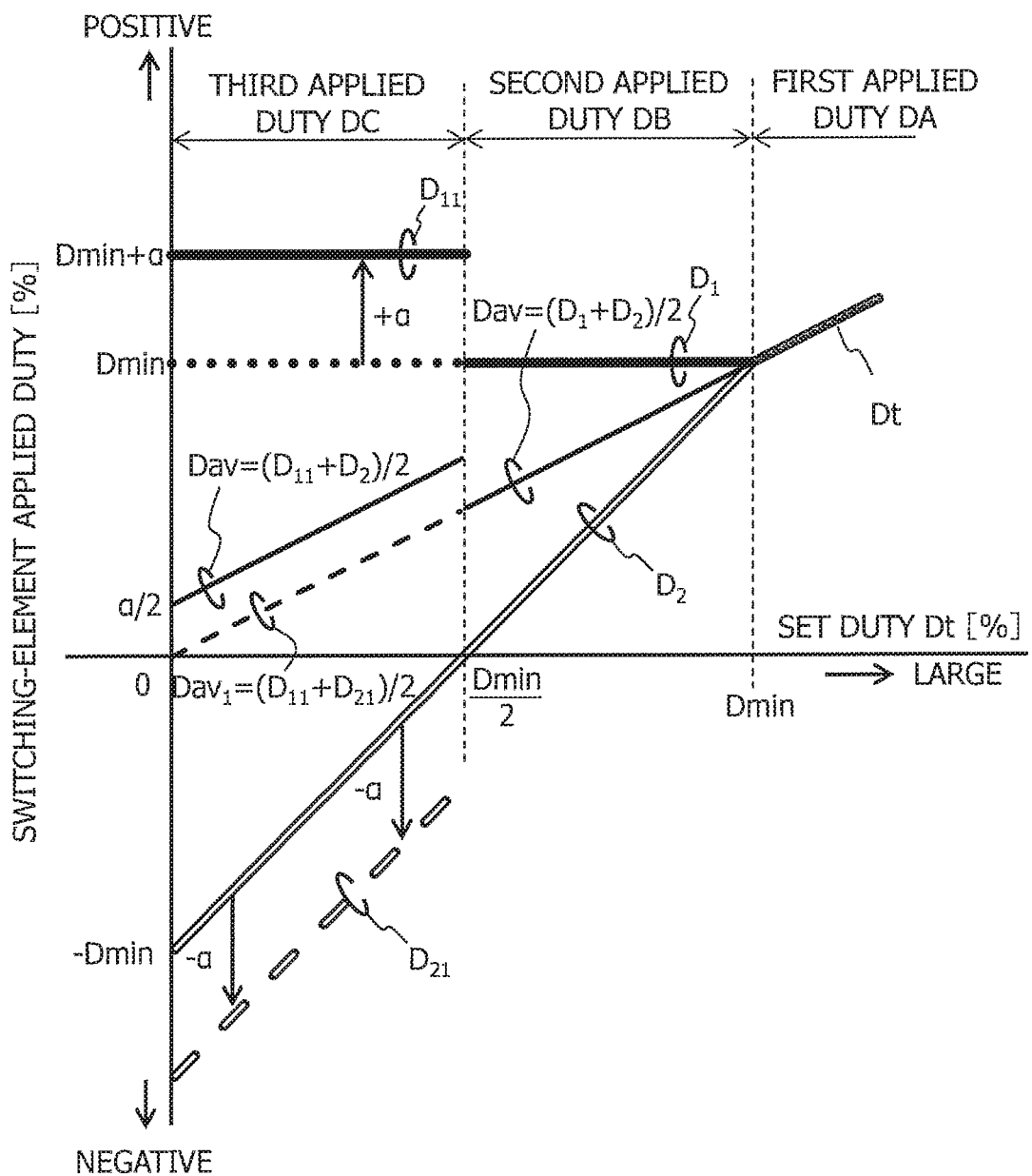
FIG. 24 is a duty illustration chart for illustrating correction to increase a main period duty.

To address this risk, in the third applied duty DC, duty correcting unit 322 corrects and increases the main period duty $D_1$, which is limited to the minimum duty Dmin, to obtain a corrected main period duty $D_{11}$. Specifically, as illustrated in FIG. 24, to compensate for the actual drop $\alpha$ in the adjustment period duty $D_2$, duty correcting unit 322 adds, to the main period duty $D_1$, a value balancing this actual drop $\alpha$, which corresponds to the dead-time periods $Z_1$ and $Z_2$. This makes the actual average duty Dav$_1$ calculated from the corrected main period duty $D_{11}$ and the actual adjustment period duty $D_{21}$ directly proportional to the set duty Dt.

Since the actual drop $\alpha$ in the adjustment period duty $D_2$ corresponds to the dead-time periods $Z_1$ and $Z_2$, the correction variable $\alpha$ for the main period duty $D_1$, which compensates for the actual drop $\alpha$, can be set based on the dead-time periods $Z_1$ and $Z_2$. For example, the correction variable $\alpha$ may be set based on a value obtained by multiplying the dead-time period $Z_1$ or $Z_2$ by an integer such as one or two. Specifically, the correction variable $\alpha$ may be set based on a value obtained by multiplying the dead-time period $Z_1$ or $Z_2$ by one when, only in the first dead-time period $Z_1$, i.e. $T_3$ until the aforementioned second dead-time period $Z_2$, i.e. $T_5$, the electric current flow sequentially through V-phase coil 110$v$ and W-phase coil 110$w$ is stopped so that the V-phase terminal voltage Vv becomes equivalent to the power supply voltage $V_B$, and then the V-phase terminal voltage Vv becomes equivalent to the ground (GND) electric potential.

The dead-time periods $Z_1$ and $Z_2$ can be previously stored in ROM or the like as fixed values according to the frequency of the PWM signal. Alternatively, the dead-time periods $Z_1$ and $Z_2$ may be calculated based on the absolute value $|D_2|$ of the adjustment period duty $D_2$ and measured energization time obtained by measuring an actual energization time X of FIG. 16.

In the above correction variable setting method, the correction variable $\alpha$ is set based on the previously-obtained dead-time periods $Z_1$ and $Z_2$. However, alternatively, the correction variable $\alpha$ may be set directly based on the calculated set duty Dt by referring to a correspondence table between the set duty Dt and the correction variable $\alpha$. Such a correspondence table is previously obtained through experiments or simulation, and stored in ROM or the like.

Figure 25:
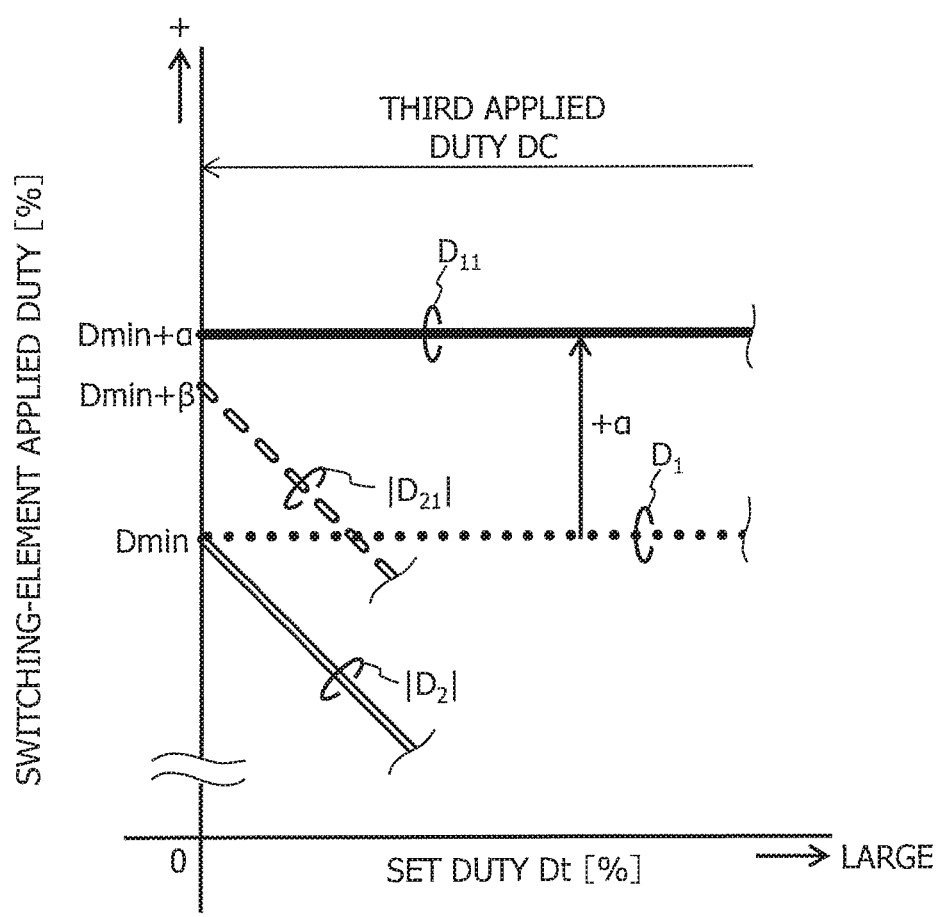
FIG. 25 illustrates a difference between the adjustment period duty and its target value when a set duty is zero.

In step 3010, the main period duty $D_1$ of the third applied duty DC is corrected and increased by adding thereto the correction variable $\alpha$, which corresponds to the dead-time periods $Z_1$ and $Z_2$. However, in reality, the actual adjustment period duty $D_{21}$ might be less than the adjustment period duty $D_2$ by $\beta$, which is less than $\alpha$, in other words, in the absolute value, $|D_{21}|$ might be greater than $|D_2|$ by $\beta$, which is less than a as illustrated in FIG. 25 for some reasons such as the electric current direction during the dead-time period $Z_1$ or $Z_2$ becomes reversed from that illustrated in FIG. 19 or 21. In this case, even when Set Duty Dt=0 is true, the difference between the absolute value $|D_{21}|$ of the actual adjustment period duty $D_{21}$ and the corrected main period duty $D_{11}$ is not zero, and thus the actual average duty Dav$_1$ is not zero. Thus, even setting the set duty Dt to zero might fail to let the motor rotation speed be zero.

To address this risk, if the motor rotation speed does not become zero nor a value estimated to be zero while Set Duty Dt=0 is true, the adjustment period duty $D_{21}$ and the corrected main period duty $D_{11}$ are set so as to bring, closer to zero, the difference between the corrected main period duty $D_{11}$ and the absolute value $|D_{21}|$ of the actual adjustment period duty $D_{21}$ in accordance with a reduction in the set duty Dt that is less than zero.

Figure 26:
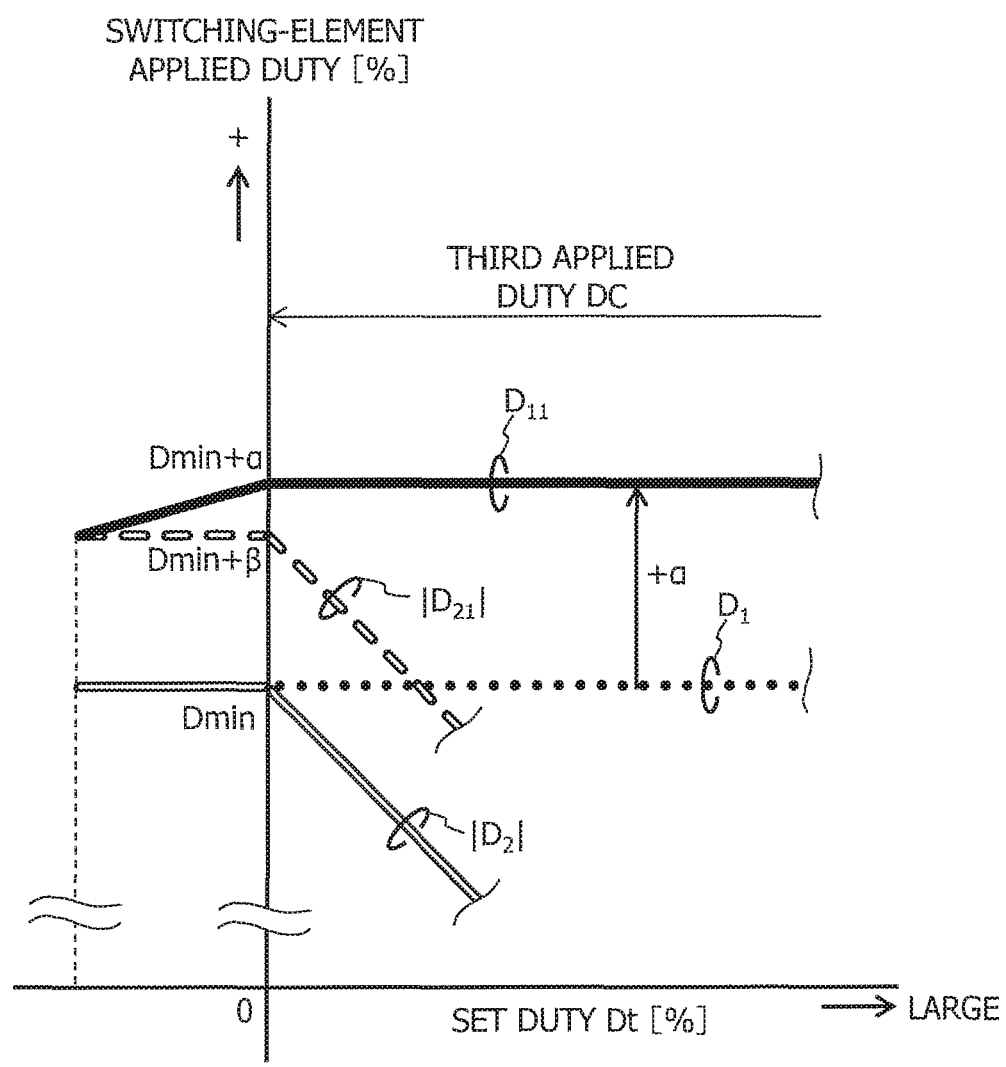
FIG. 26 illustrates how the corrected main period duty is adjusted toward the negative-side of the set duty.

For example, a method as illustrated in FIG. 26 may be employed to bring, closer to zero, the difference between the corrected main period duty $D_{11}$ and the absolute value $|D_{21}|$ of the actual adjustment period duty $D_{21}$. Specifically, in this method, the value of the corrected main period duty $D_{11}$ is gradually reduced toward the minimum duty Dmin in accordance with a reduction in the set duty Dt that is less than zero, while the absolute value $|D_2|$ of the adjustment period duty $D_2$ is maintained at the minimum duty Dmin, which is a value to be set while Set Duty Dt=0 is true.

Figure 27:
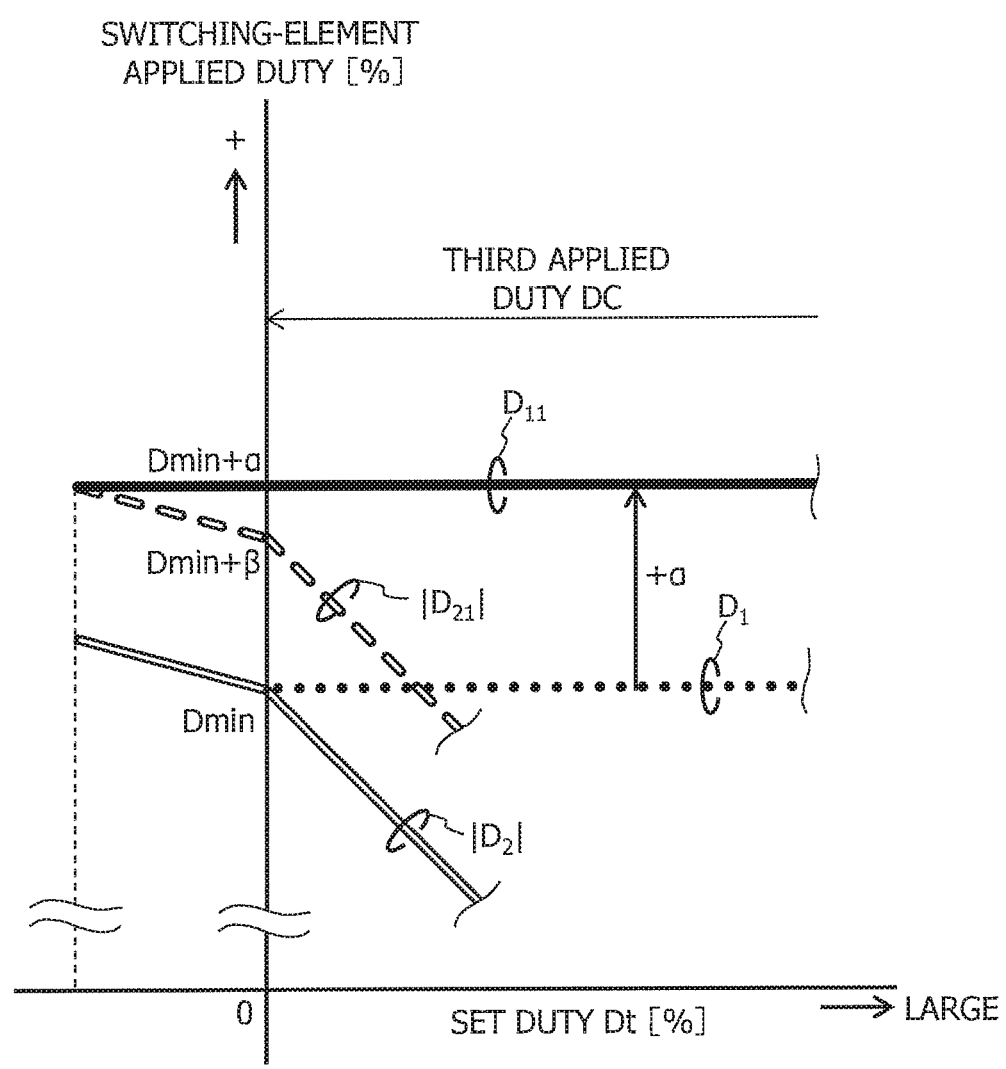
FIG. 27 illustrates how the adjustment period duty is adjusted toward the negative-side of the set duty.

Alternatively, a method as illustrated in FIG. 27 may be employed to bring, closer to zero, the difference between the corrected main period duty $D_{11}$ and the absolute value $|D_{21}|$ of the actual adjustment period duty $D_{21}$. Specifically, in this method, the absolute value $|D_2|$ of the adjustment period duty $D_2$ is gradually increased toward Dmin+α in accordance with a reduction in the set duty Dt that is less than zero, while the corrected main period duty $D_{11}$ is maintained to be Dmin+α, which is a value to be set while Set duty Dt=0 is true.

Figure 28:
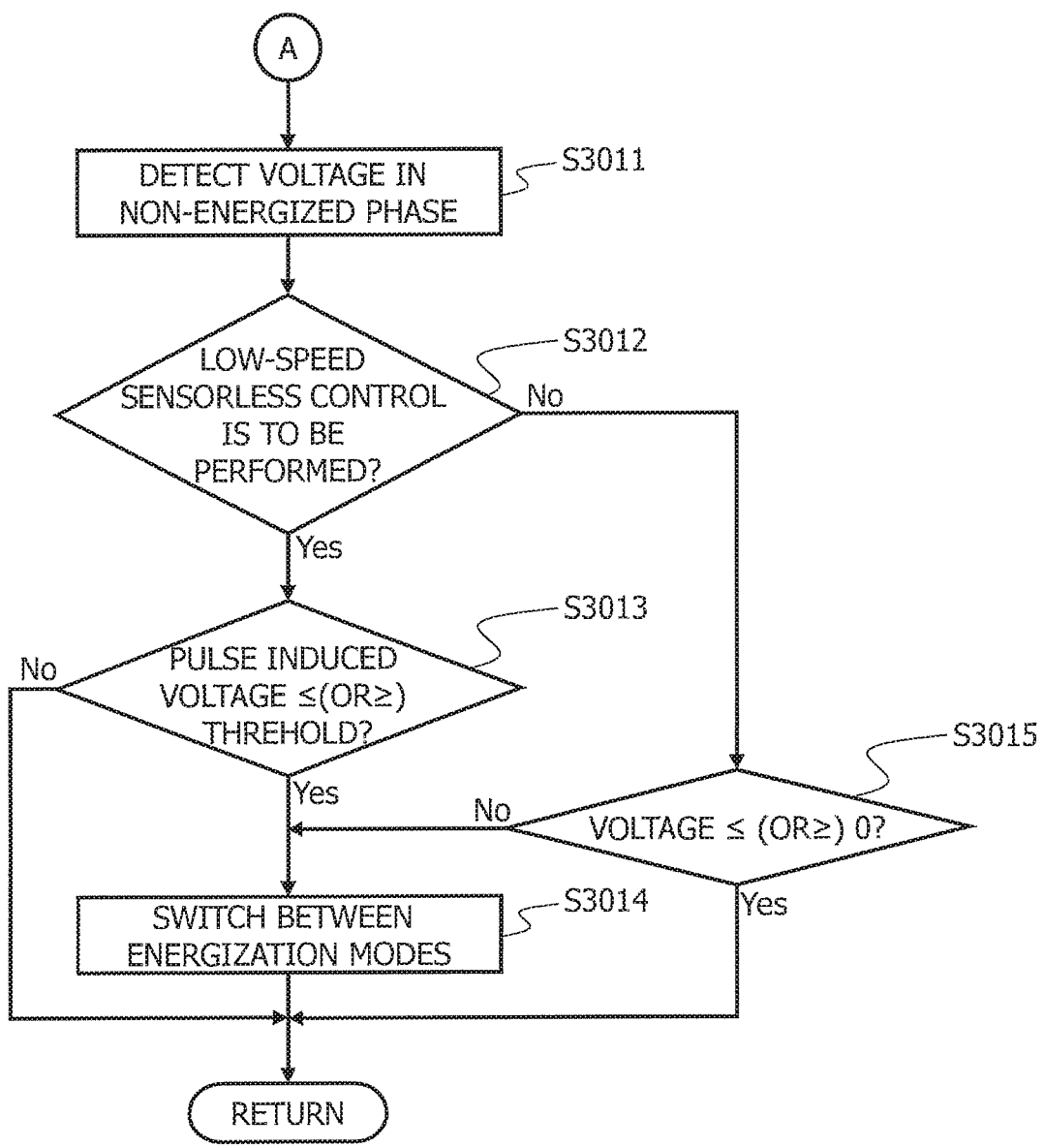
FIG. 28 is a flowchart exemplifying the last half of the sensorless control subroutine.

The flowchart of FIG. 28 represents the last half of the subroutine of the sensorless control using rotation speed feedback in step 2005 of the flowchart of FIG. 9. The processing represented in FIG. 28 is executed subsequently to step 3006, 3008 or 3010 in the flowchart of FIG. 10.

In step 3011, non-energized phase voltage selecting unit 316 detects the pulse induced voltage in a non-energized phase in the current energization mode. Specifically, non-energized phase voltage selecting unit 316 detects the W-phase voltage Vw in the energization modes M1 and M4, detects the V-phase voltage Vv in the energization modes M2 and M5, and detects the U-phase terminal voltage in the energization modes M3 and M6.

Immediately after the energization mode switching, a commutation current is generated. However, determining the energization mode switching timing by using the voltage detected across a path in which the commutation current is generated leads to erroneous determination. To avoid this, the voltage values detected immediately after the energization mode switching, for a predetermined number of detections from the first after the energization mode switching, may be counted out of the criterion for the determination of that switching timing. This predetermined number of detections to be counted out may be set to a variable value that changes in accordance with the motor rotation speed and the electric current (motor load) actually flowing through brushless motor 100. The higher the motor rotation speed and the larger the actual current, the greater value can be set as this predetermined number.

In step 3012, it is determined whether or not a condition for performing the low-speed sensorless control is satisfied.

Specifically, the determination is made based on whether or not the motor rotation speed is above a preset rotation speed, which is a reference speed for choosing between the low-speed sensorless control and the high-speed sensorless control. The preset rotation speed is set to the minimum motor rotation speed that allows the mode switching determination using the speed electromotive voltage as a trigger, and previously determined through experiments or simulation and stored. Note that it is preferable that the preset rotation speed is set so as to prevent the switching between these sensorless controls from being performed repeatedly at short intervals. For that purpose, as the preset rotation speed, there may be set a first preset rotation speed for determining that timing for switching to the low-speed sensorless control has come, and a second preset rotation speed (> first preset rotation speed) for determining that timing for stopping the low-speed sensorless control has come.

When it is determined that the condition for performing the low-speed sensorless control is satisfied in step 3012, in other words, when the motor rotation speed is less than the preset rotation speed, the operation proceeds to step 3013. In step 3013, comparing unit 310 compares the threshold outputted by voltage threshold switching unit 312 and the pulse induced voltage in a non-energized phase outputted by non-energized phase voltage selecting unit 316. When determining that the pulse induced voltage in a non-energized phase crosses the threshold, comparing unit 310 determines that the energization mode switching timing has come, and the operation proceeds to step 3014. In step 3014, energization mode determining unit 308 determines the next energization mode and switches the current energization mode thereto.

On the other hand, when it is determined that the condition for performing the low-speed sensorless control is not satisfied in step 3012, in other words, when the motor rotation speed is above the preset rotation speed, the operation proceeds to step 3015. In step 3015, control unit 220 performs the high-speed sensorless control. In the high-speed sensorless control, as the switching timing to the next energization mode, there is detected a time point when the rotor rotates further by 30 degrees from a time point when the pulse induced voltage in a non-energized phase crosses the zero level.

Specifically, the rotor angle of 30 degrees is converted into the corresponding time based on the motor rotation speed, and, at a time point exactly after the elapse of the time corresponding to the rotor angle of 30 degrees from the zero-cross time point, control unit 220 determines that the switching timing to the next energization mode has come. Then, the operation proceeds to step 3014, in which the energization mode is switched to the next one.

In motor controller 200 as described above, the main period duty $D_1$ of the third applied duty DC is corrected and increased to the corrected main period duty $D_{11}$ by adding, to the main period duty $D_1$ limited to the minimum duty Dmin, the value balancing the actual drop α in the adjustment period duty $D_2$, which corresponds to the dead-time periods $Z_1$ and $Z_2$, and thereby compensates for the actual drop α in the adjustment period duty $D_2$. This allows the actual average duty $Dav_1$ calculated from the corrected main period duty $D_{11}$ and the actual adjustment period duty $D_{21}$ to be directly proportional to the set duty Dt, and thus can improve the linearity in the motor rotation speed with respect to the set duty Dt.

As a result, a gap, during which the motor rotation speed drops quickly, is less likely to occur even when the value of the adjustment period duty $D_2$ changes from positive to negative. Accordingly, the hunting of the motor rotation speed is less likely to occur even during rotation speed feedback control. This suppresses the fluctuation in the discharge flow rate of the cooling water from electric water pump 26 driven by brushless motor 100, and improves the control accuracy on the cooling water temperature. Therefore, a reduction in fuel economy can be suppressed.

Note that, in the above embodiment, as to the N periods of the PWM signal, which are formed of one main period and (N−1) adjustment periods, it is assumed that N=2 for convenience of explanation. However, the N value may alternatively be an integer greater than two. In this case as well, the main period duty $D_1$ can be corrected similarly to the aforementioned correction.

Moreover, in the above embodiment, duty correcting unit 322 may correct and increase the main period duty $D_1$ of the third applied duty DC when the cooling water temperature detected by water temperature sensor 28 is less than a predetermined temperature. When the cooling water temperature is relatively low, specifically, for example, at the start-up of engine 10, it is necessary to cause electric water pump 26 to circulate the cooling water at such a relatively low flow rate as not to affect friction in engine 10 so as to suppress an occurrence of a hot spot in which the cooling water temperature rises only in and around engine 10, and thus to improve fuel economy of engine 10. To satisfy this need, brushless motor 100 has to rotate within an extremely low rotation speed range that causes the set duty Dt to fall well below the minimum duty Dmin. Accordingly, if the main period duty $D_1$ is corrected and increased as described above when the cooling water temperature is relatively low, a gap, during which the motor rotation speed drops quickly, is less likely to occur. Accordingly, the hunting of the motor rotation speed is less likely to occur during rotation speed feedback control. Since the cooling water increases in viscosity as the cooling water temperature decreases, electric power consumption due to the hunting of the motor rotation speed can be reduced, which has a particularly great significance.

Hereinafter, the technical concepts, other than those recited in the appended claims, which can be understood from the above embodiment will be described with their effects.

(A) The brushless motor controller according to claim 3, in which the correcting means corrects and increases a duty during a main period among the multiple contiguous periods of the PWM signal to be applied to the switching element connected to the one of the two phases, by adding, to the duty during the main period, a correction variable equivalent to an integral multiple of the dead-time period.

This makes it possible to compensate for an actual drop corresponding to the dead-time period in the adjustment period duty.

(B) The brushless motor controller according to any one of claims 1 to 3 and (A), in which the correcting means corrects and increases a duty during a main period by using a correction variable based on the set duty.

This makes it possible to calculate the correction variable directly from the set duty without referring to the dead-time period.

(C) The brushless motor controller according to any one of claims 1 to 3, (A) and (B), in which the correcting means corrects and increases a duty during a main period on the basis of an actual time for which a voltage equivalent to the power supply voltage are applied between both terminals of two energized phases during an adjustment period.

This makes it possible to correct and increase the duty during the main period on the basis of the actual energization time even if the current direction is changed during the dead-time period to overturn the presumption that an energization time be the sum of the dead-time period and time corresponding to a duty during the adjustment period.

(D) The brushless motor controller according to any one of claims 1 to 3, and (A) to (C), in which, when the brushless motor drives an electric water pump for cooling an engine, the correcting means corrects and increases a duty during a main period when a temperature of cooling water is less than a predetermined temperature.

This is of great significance since this makes it possible to rotate the brushless motor at an extremely low rotation speed while the brushless motor causes the electric water pump to circulate the cooling water at such a relatively low flow rate as not to affect friction in the engine so as to suppress an occurrence of a hot spot in which the cooling water temperature rises only in and around the engine at the start-up of the engine and thus to improve fuel economy of the engine.

REFERENCE SYMBOL LIST

100 Brushless motor
110u U-phase
110v V-phase
110w W-phase
120 Rotor
200 Motor controller
210 Drive circuit
212a to 212f Switching element
302 Applied voltage calculating unit
304 PWM generating unit
306 Gate signal switching unit
308 Energization mode determining unit
310 Comparing unit
312 Voltage threshold switching unit
316 Non-energized phase voltage selecting unit
318 Main period duty setting unit
320 Adjustment period duty setting unit
322 Duty correcting unit

The invention claimed is:

1. A brushless motor controller for switching, based on a detected value of a pulse induced voltage induced in a non-energized phase, between energization modes for causing switching elements bridge-connected to a three-phase brushless motor to apply, to two phases, a pulse voltage according to a pulse width modulation signal, the brushless motor controller comprising:

limiting means for, when a set duty of the pulse width modulation signal is less than a first predetermined value, limiting, to the first predetermined value, a duty during a predetermined period among a plurality of contiguous periods of the pulse width modulation signal to be applied to the switching elements connected to one of the two phases so as to set the predetermined period as a period for detecting the pulse induced voltage;

adjusting means for adjusting a duty during a period other than the predetermined period among the plurality of contiguous periods in the pulse width modulation signal on the basis of the set duty and the duty during the predetermined period which is limited to the first predetermined value, the duty during the period other than the predetermined period being applied to the switching elements connected to the one of the two phases when the set duty is not less than a second predetermined value that is less than the first predetermined value, but applied to the switching elements connected to the other of the two phases when the set duty is less than the second predetermined value; and correcting means for correcting and increasing the duty during the predetermined period when the set duty is less than the second predetermined value.

2. The brushless motor controller according to claim 1, wherein
the adjusting means sets the duty of the pulse width modulation signal such that a pair of the pulse width modulation signals respectively applied to two switching elements, which are an upper-arm switching element and a lower arm switching element, and which are connected to the other of the two phases, have phases opposite to each other, and such that the pair of the pulse width modulation signals has a dead-time period during which the two switching elements are both turned OFF at timing of ON and OFF switching of the two switching elements, and
the correcting means corrects and increases the duty during the predetermined period in accordance with the dead-time period.

3. The brushless motor controller according to claim 2, wherein the correcting means corrects and increases the duty during the predetermined period by adding, to the duty during the predetermined period, a correction variable equivalent to an integral multiple of the dead-time period.

4. The brushless motor controller according to claim 2, wherein the dead-time period is previously set according to a frequency of the pulse width modulation signal.

5. The brushless motor controller according to claim 2, wherein the correcting means corrects and increases the duty during the predetermined period according to an energization time for which an electric current actually flows through the two phases during the dead-time period.

6. The brushless motor controller according to claim 5, wherein the energization time is actually measured.

7. The brushless motor controller according to claim 1, wherein the correcting means previously stores therein a correspondence table between the set duty and a correction variable used for correcting and increasing the duty during the predetermined period, sets the correction variable based on the set duty by referring to the table, and corrects and increases the duty during the predetermined period based on the set correction variable.

8. The brushless motor controller according to claim 1, wherein, when the set duty takes a negative value, the correcting means gradually reduces the duty during the predetermined period that is corrected and increased, in accordance with a reduction in the set duty.

9. The brushless motor controller according to claim 1, wherein, when the brushless motor drives an electric water pump for cooling an engine, the correcting means corrects and increases the duty during the predetermined period when a temperature of cooling water supplied to the engine by the electric water pump is less than a predetermined temperature.

10. A brushless motor control method using a brushless motor control unit for switching, based on a detected value of a pulse induced voltage induced in a non-energized phase, between energization modes for causing switching elements bridge-connected to a three-phase brushless motor to apply, to two phases, a pulse voltage according to a pulse width modulation signal, the brushless motor control method comprising the steps of:
causing the brushless motor control unit to, when a set duty of the pulse width modulation signal is less than a first predetermined value, limit to the first predetermined value, a duty during a predetermined period among a plurality of contiguous periods of the pulse width modulation signal to be applied to the switching elements connected to one of the two phases so as to set the predetermined period as a period for detecting the pulse induced voltage;
causing the brushless motor control unit to adjust a duty during a period other than the predetermined period among the plurality of contiguous periods in the pulse width modulation signal on the basis of the set duty and the duty during the predetermined period which is limited to the first predetermined value, the duty during the period other than the predetermined period being applied to the switching elements connected to the one of the two phases when the set duty is not less than a second predetermined value that is less than the first predetermined value, but applied to the switching elements connected to the other of the two phases when the set duty is less than the second predetermined value; and
causing the brushless motor control unit to correct and increase the duty during the predetermined period when the set duty is less than the second predetermined value.

* * * * *